United States Patent
Numai et al.

(10) Patent No.: US 6,833,549 B2
(45) Date of Patent: Dec. 21, 2004

(54) RADIATION DETECTOR, RADIATION IMAGING SYSTEM, RADIATION DETECTING METHOD AND RADIATION IMAGING METHOD

(75) Inventors: Takahiro Numai, Ninomiya (JP); Masakazu Morishita, Hiratsuka (JP)

(73) Assignee: Canon Kabushiki Kaisha, Tokyo (JP)

(*) Notice: Subject to any disclaimer, the term of this patent is extended or adjusted under 35 U.S.C. 154(b) by 109 days.

(21) Appl. No.: 10/300,641

(22) Filed: Nov. 21, 2002

(65) Prior Publication Data

US 2003/0127599 A1 Jul. 10, 2003

(30) Foreign Application Priority Data

Nov. 30, 2001 (JP) ........................................ 2001-367148

(51) Int. Cl.[7] .................................................. G01T 1/24
(52) U.S. Cl. .......................... 250/370.14; 250/336.1; 250/370.01
(58) Field of Search ..................... 250/370.14, 336.1, 250/370.01

(56) References Cited

U.S. PATENT DOCUMENTS

| 5,159,424 | A | | 10/1992 | Morishita | 357/34 |
|---|---|---|---|---|---|
| 5,602,414 | A | * | 2/1997 | Mitsui et al. | 257/442 |
| 5,856,699 | A | | 1/1999 | Hayashi et al. | 257/433 |
| 6,246,043 | B1 | * | 6/2001 | Merrill | 250/208.1 |
| 6,352,875 | B1 | | 3/2002 | Hayashi et al. | 438/67 |
| 6,388,470 | B1 | * | 5/2002 | Mattos et al. | 326/81 |
| 2002/0056810 | A1 | | 5/2002 | Kobayashi et al. | 250/370.09 |

FOREIGN PATENT DOCUMENTS

JP     9-276265     10/1997

* cited by examiner

*Primary Examiner*—Constantine Hannaher
*Assistant Examiner*—Christine Sung
(74) *Attorney, Agent, or Firm*—Fitzpatrick, Cella, Harper & Scinto

(57) ABSTRACT

An electric field is applied to a charge emitting layer. The charge emitting layer absorbs radioactive rays generated by a radiation source, converts the rays into electric charges, and emits the converted charges. The electric field has an intensity satisfying a lower limit of a specification value of a carrier capturing efficiency and an upper limit of a specification value of a dark current density. A dark current at a trap level can be lowered, a carrier capturing efficiency can be improved, and radioactive rays can be detected with small noises and at a high sensitivity. It is possible to reliably detect incident radioactive rays and form an image of incident radioactive rays.

13 Claims, 37 Drawing Sheets

TiBr, CsI, Se ATTENUATION

LINEAR ABSORPTION OF TIBr, CsI, AND Se

RADIATION DETECTOR, RADIATION IMAGING SYSTEM, RADIATION DETECTING METHOD AND RADIATION IMAGING METHOD

BACKGROUND OF THE INVENTION

1. Field of the Invention

The present invention relates to a radiation detector, a radiation imaging system, a radiation detecting method, a radiation imaging method, a computer readable storage medium, and a computer program, particularly suitable for electronically imaging a radiation image of radioactive rays such as X-rays transmitted through a human body or the like.

2. Description of the Related Art

As a conventional method of converting one type of radioactive rays, X-rays, into electric signals and obtaining an X-ray image, a combination of an image intensifier (I.I.) for converting X-rays into light, a television camera and a television is used (I.I.—TV system).

In the I.I.—TV system, the size of an X-ray input plane of an image intensifier is an imaging size. Some system has the size of about 16 inches. An X-ray image converted into light is once focused in an image intensifier output unit, and this output image is taken with a television camera via an optical system to output it as an electrical image. With this system, an X-ray image can be observed in real time. Documents describing such techniques are disclosed, for example, in Japanese Patent Application Laid-open No. 9-276265.

A semiconductor radiation detector has been paid attention as a high speed radiation detector for outputting an image in real time. With this semiconductor radiation detector, there is a problem of dark current noises. Dark current by re-combination at a trap level has been analyzed to date by the Schockly—Read method.

As the documents describing such techniques, for example, the paper is known which is described in Nuclear Instruments and Methods in Physics Research issued in 1999, A Vol. 434, pp. 44 to 56.

Conventional systems described above are, however, associated with an insufficient resolution which is required to be improved in some degree. As compared with film imaging, the imaging system becomes large so that the installation place is limited and transport of the system is limited. There are still many points to be improved.

For dark current of a semiconductor radiation detector, if a trap cross sectional area of electrons or holes at a trap level is small, analysis for determining specifications cannot be made.

SUMMARY OF THE INVENTION

Under the above-described problems, a first feature of the invention is to reliably and correctly detect and image incident radiation.

A second feature of the invention is to detect and image incident radiation with excellent sensitivity characteristics.

The invention provides at least one of the two features.

According to a first aspect of the present invention, there is provided a radiation detector including a radiation detecting element having: a charge emitting layer for converting an incident radioactive ray into an electric charge and emitting the converted charge; a semiconductor layer of a first conductivity type; and a semiconductor layer of a second conductivity type opposite to the first conductivity type, wherein at least the charge emitting layer is sandwiched between the first conductivity type semiconductor layer and second conductivity type semiconductor layer, the radiation detector comprising bias applying means for applying an electric field to the charge emitting layer, the electric field having an intensity satisfying a lower limit of a specification value of a carrier capturing efficiency and an upper limit of a specification value of a dark current density.

DETAILED DESCRIPTION OF THE PREFERRED EMBODIMENTS

With reference to the accompanying drawings, a radiation detector, a radiation imaging system, a radiation detecting method and a radiation imaging method according to the embodiments of the present invention will be described in detail.

In the following embodiments, X-rays are detected by way of example. Radioactive rays are not limited only to X-rays, but other electromagnetic waves such as $\alpha$ rays, $\beta$ rays and $\gamma$ rays may also be used. X-rays are most general.

Figure 1:
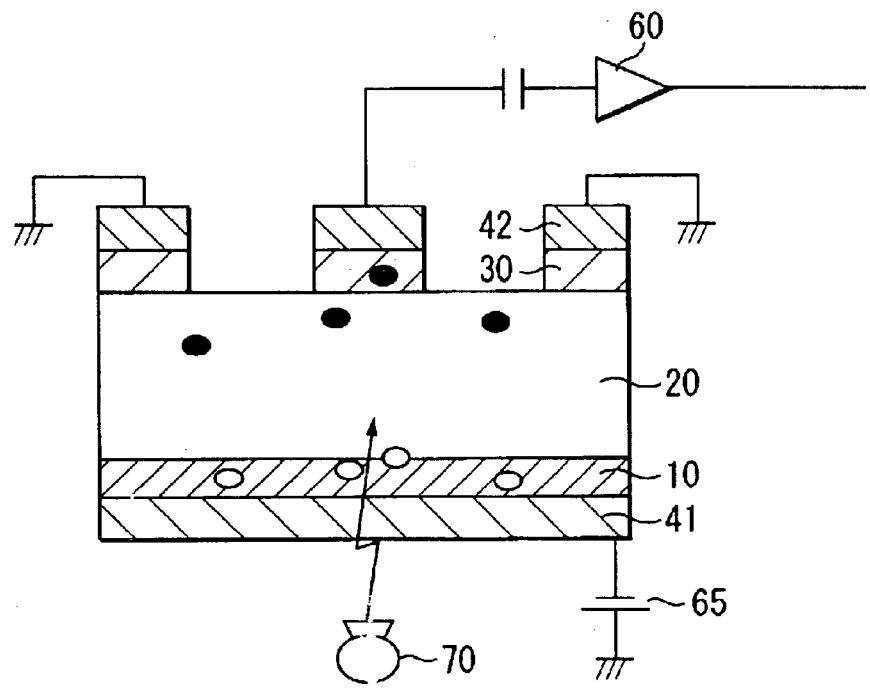
FIG. 1 is a simplified cross sectional view of an X-ray sensor as one example of a radiation detector according to an embodiment of the invention.

FIG. 1 is a simplified cross sectional view of a radiation detector according to an embodiment.

Referring to FIG. 1, reference numeral 10 represents a p-layer made of semiconductor such as GaAs, GaP, Ge and Si. Reference numeral 20 represents a charge emission layer for absorbing radiation and emitting charges. When X-rays are irradiated, electrons and holes are formed. The charge emission layer 20 is an i-layer and has a small carrier concentration. The i-layer of an n-type is called a $\gamma$-type and the i-layer of a p-type is called a n-type.

Reference numeral 30 represents an n-layer. If the i-layer is of the $\gamma$-type, a depletion layer is formed at the interface between the p-layer 10 and i-layer 20 and extends toward the i-layer 20 side. If the i-layer 20 is of the $\pi$-type, the depletion layer is formed at the interface between the n-layer 30 and i-layer 20 and extends toward the i-layer 20 side. Reference numerals 41 and 42 represent electrodes made of a metal layer.

As shown in FIG. 1, the radiation detector is reversely biased by a bias means 65 to form a depletion layer sufficient for detecting radiation in the charge emission layer 20.

As will be later described, the n-layer 30 side of the radiation detector is connected to the source or drain of an n-type thin film transistor as one example of a control means to be described later.

Figure 2:
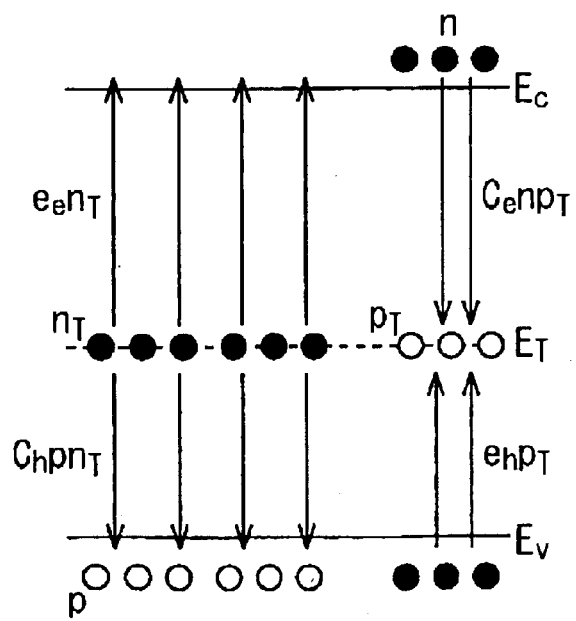
FIG. 2 is a diagram showing the relation between a trap level of the X-ray sensor, an energy level at the bottom of the conduction band, and an energy level at the top of the valence band.

A trap level exists in the charge emission layer 20 in many cases. FIG. 2 shows the relation between the trap level, an energy level at the bottom of the conduction band and an energy level at the top of the valence band.

In FIG. 2, $E_c$, $E_v$ and $E_T$ represent an energy level at the bottom of the conduction band, an energy level at the top of the valence band and the trap level, respectively. In FIG. 2, a black circle represents an electron, and a white circle represents a hole in the valence band and an empty level at the trap level.

In FIG. 2, $n_T$ and $p_T$ represent an electron concentration at the trap level and a concentration of the empty trap level, respectively, n represents a concentration of conduction electrons and p represents a concentration of holes. Arrows in FIG. 2 represent a transition process (the direction of an arrow is the direction of transition electrons).

A transition rate of an electron from the trap level ($E_T$) to the conduction band can be represented by $e_e n_T$, and a transition rate of an electron from the conduction band to the trap level can be represented by $C_e p_T n$. Similarly, a transition rate of a hole from the trap level to the conduction band can be represented by $e_h p_T$, and a transition rate of a hole from the conduction band to the trap level can be represented by $C_h n_T p$.

Here, $e_e$ and $e_h$ represent an electron emission coefficient and a hole emission coefficient, respectively, and $C_e$ (=$\sigma_e v_{eth}$) and $C_h$ (=$\sigma_h v_{hth}$) represent an electron trap coefficient and a hole trap coefficient, respectively.

$\sigma_e$ and $\sigma_h$ represent electron trap cross sectional areas, and $v_{eth}$ and $v_{hth}$ represent a conduction electron thermal speed and a hole thermal speed, respectively.

If the charge emission layer 20 is isolated, the rate equations of a conduction electron concentration and a hole concentration are represented by the following equations (1), and (2).

$$\frac{dn}{dt} = e_c n_T - C_e p_T n \tag{1}$$

$$\frac{dp}{dt} = e_h p_T - C_h n_T p \tag{2}$$

A concentration of conduction electrons is first studied. From the equation (1), an electron concentration $N_B$ of the electron emission layer 20 in a steady state can be given by the following equation (3).

$$n = N_B = \frac{e_c n_T}{C_e p_T} \tag{3}$$

If the charge emission layer 20 has junctions with the p-layer 10 and n-layer 30, electrons and holes are diffused in a thermal equilibrium state to make both the Fermi levels become coincident, so that the junction interfaces are depleted.

If this diffusion of electrons lost from the charge emission layer is taken into consideration, the rate equation of an electron concentration in the charge emission layer 20 is modified to the following equation (4).

$$\frac{dn}{dt} = e_c n_T - C_e p_T n - D_e \nabla^2 n \tag{4}$$

where $D_e$ is a diffusion constant of electrons diffusing from the charge emission layer 20 to the junction layer.

If it is assumed that if the trap level $n_T$ does not exist, the diffusion current and drift current cancel out in the thermal equilibrium state. The value $(-D_e \nabla^2 n)$ can be given by the following equation (5) by using relaxation time simulation.

$$-D_e \nabla^2 n = \frac{n - n_0}{\tau_{ec}} \tag{5}$$

Here, $n_0$ represents an electron concentration of the junction layer before junction is formed, and $\tau_{ec}$ represents an average collision time of electrons. By substituting the equation (5) into the equation (4), the following rate equation (6) can be obtained.

$$\frac{dn}{dt} = e_e n_T - C_e p_T n - \frac{n - n_0}{\tau_{ec}} \tag{6}$$

In the steady state, the electron concentration $n_s$ in the depleted charge emission layer 20 is given by the following equation (7).

$$n_s = \left(C_e p_T + \frac{1}{\tau_{ec}}\right)^{-1} \left(e_c n_T + \frac{n_0}{\tau_{ec}}\right) \tag{7}$$

Figure 3:
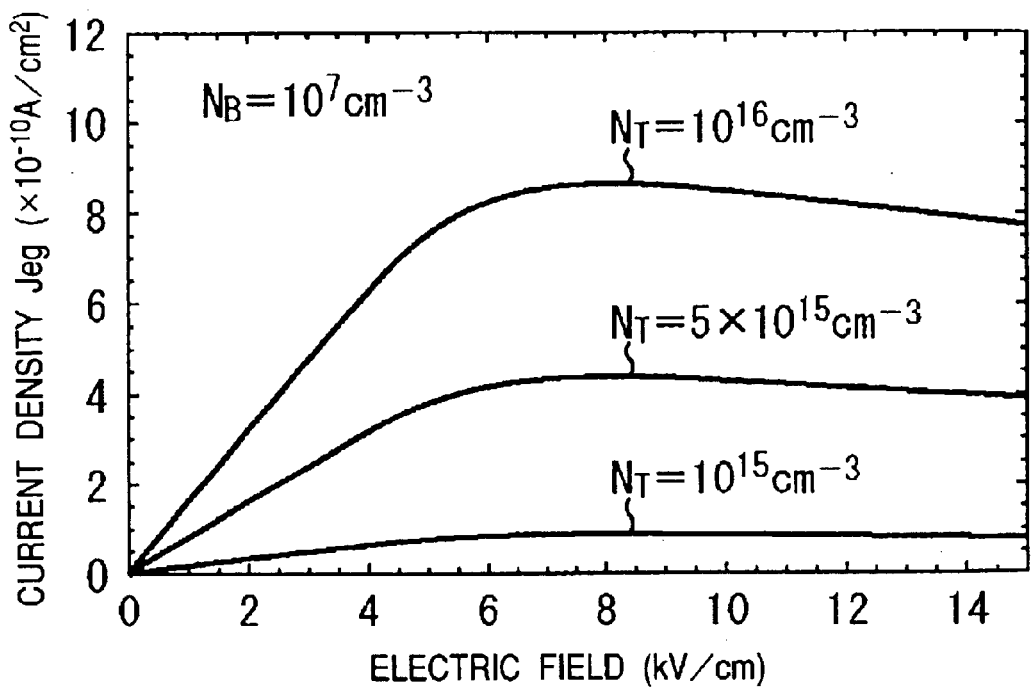
FIG. 3 is a graph showing an example of the relation between dark current caused at the trap level of the X-ray sensor and voltage applied to a depletion layer, as a parameter of a trap concentration.
Figure 4:
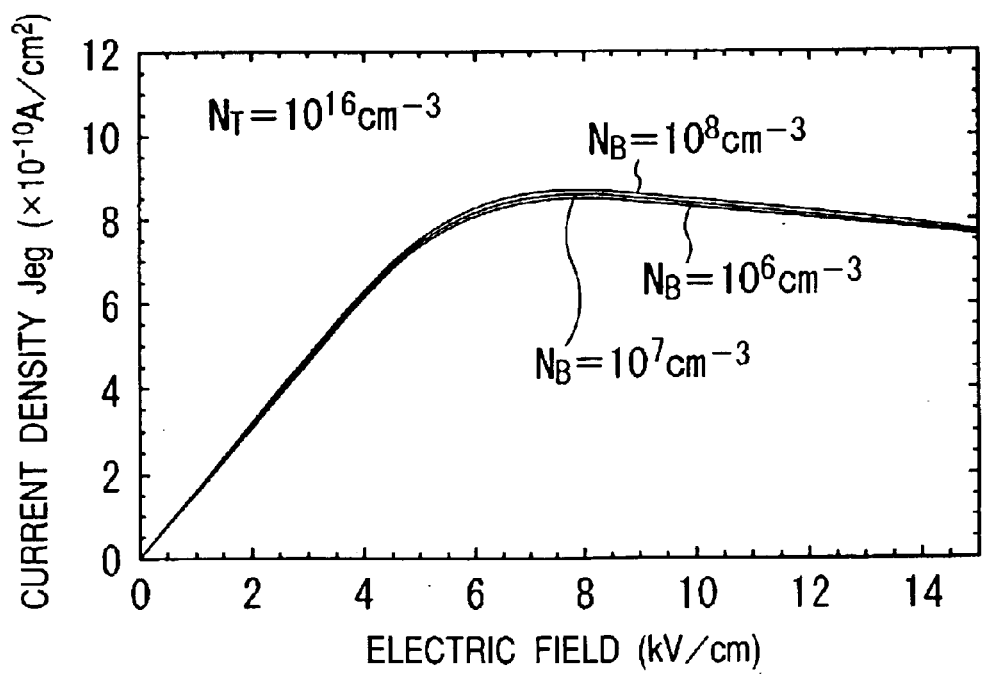
FIG. 4 is a graph showing an example of the relation between dark current caused at the trap level of the X-ray sensor and voltage applied to a depletion layer, as a parameter of an electron concentration in a charge emission layer.

By representing the electron drift speed by $v_{ed}$ (=$\mu_e E$), a current density $J_{eg}$ by electrons generated at the trap level $E_T$ is given by the following equation (8).

$$J_{eg} = e n_s v_{ed} = e\left(C_e p_T + \frac{1}{\tau_{ec}}\right)^{-1} \left(e_c n_T + \frac{n_0}{\tau_{ec}}\right) \mu_e E \tag{8}$$

where $\mu_e$ represents a mobility of an electron. The calculated results of the current density $J_{eg}$ at the absolute temperature T of 300 K are shown in FIGS. 3 and 4. Since the electron drift speed $v_{ed}$ is a function of an electric field in the depleted region, the current densities $J_{eg}$ were plotted relative to the electric field.

In the calculated results shown in FIG. 3, the electron concentration $N_B$ in the charge emission layer 20 was set to $10^7$ cm$^{-3}$ and the concentration $N_T$ (=$n_T + p_T$) of trap levels ($E_T$) was used as a parameter.

It can be understood from FIG. 3 that if the concentration $N_T$ of trap levels occupied by electrons is $10^{16}$ cm$^{-3}$, the dark current specification set to $4 \times 10^{-9}$ A/cm$^2$ is satisfied by all of the electric fields. If the dark current specification is made smaller by one digit to $4 \times 10^{-10}$ A/cm$^2$, it is sufficient if the electric field is set to 2.45 kV/cm or lower.

In the calculation results shown in FIG. 4, the concentration $N_T$ of trap levels ($E_T$) in the charge emission layer 20 was set to $10^{16}$ cm$^{-3}$ and the electron concentration was used as a parameter. It can be understood from FIG. 4 that the current does not so much depend upon the electron concentration $N_B$.

Similarly, the current density $J_{hg}$ by holes generated at the trap level ($E_T$) is given by the following equation (9).

$$J_{hg} = e\left(C_h n_T + \frac{1}{\tau_{hc}}\right)^{-1} \left(e_h p_T + \frac{p_0}{\tau_{hc}}\right) \mu_h E \tag{9}$$

where $\mu_h$ represents a mobility of a hole.

A current by carriers generated at the trap level ($E_T$) is given by a sum of the calculated results of the equations (8) and (9). If the specification value of the dark current density is $J_0$ and the electric field E applied to the charge emission layer 20 satisfies the following equation (10), then the dark current by the trap level $E_T$ can be suppressed smaller than the specification value.

$$E \leq \frac{J_0}{e} \left[ \mu_e \left(C_e p_T + \frac{1}{\tau_{ec}}\right)^{-1} \left(e_c n_T + \frac{n_{p0}}{\tau_{ec}}\right) + \right. \tag{10}$$

$$\left. \mu_h \left(C_h n_T + \frac{1}{\tau_{hc}}\right)^{-1} \left(e_h p_T + \frac{p_{a0}}{\tau_{hc}}\right) \right]^{-1}$$

Next, the carrier capturing efficiency will be studied. It is assumed that as X-rays are irradiated from a radiation source 70 shown in FIG. 1, the electron concentration n changes to $n_s + \Delta_n$ ($n_s$ is a constant value with no X-ray). This is substituted into the equation (6) to obtain the following equation (11).

$$\frac{d}{dt}\Delta n = -C_e p_T \Delta n - \frac{\Delta n}{\tau_{ec}} \tag{11}$$

In the right side of the equation (11), the first term represents electron disappearance at the trap level ($E_T$) and the second term represents a rate of an electron moving to the electrode. By representing an attenuation coefficient of the electron concentration at the trap level ($E_T$) by $\alpha_e$, the relation by the following equation (12) can be obtained.

$$\frac{d}{dz}\Delta n = -\alpha_{eT}\Delta n = \frac{dt}{dz}\frac{d}{dt}\Delta n = \frac{1}{v_{ed}}\frac{d}{dt}\Delta n \tag{12}$$

where $V_{ed}$ represents a drift speed of an electron. The higher the electric field, i.e., the higher the voltage applied to the X-ray sensor, the higher the drift speed. From the comparison between the first term of the right side of the equation (11) and the equation (12), the attenuation factor $\alpha_{eT}$ can be given by the following equation (13).

$$\alpha_{eT} = \frac{C_e p_T}{v_{ed}} \tag{13}$$

As seen from the equation (13), the attenuation coefficient $\alpha_{eT}$ is in inverse proportion to the electron drift speed $V_{ed}$. Therefore, the larger the voltage applied to the X-ray sensor, the smaller the attenuation coefficient $\alpha_{eT}$ becomes. Assuming that DQE=0.7 at the depletion layer width W=1 mm, the spatial distribution of electron concentrations $\Delta_n$ can be given in average by the following equation (14).

$$\Delta n = \Delta n_0 \exp(-\alpha_s x), \alpha_s = 12.04 \text{ cm}^{-1} \tag{14}$$

The electron capturing efficiency $\eta$ can therefore be given by the following equation (15).

$$\eta = \frac{\int_0^W \Delta n_0 \exp(-\alpha_s x)\exp[-\alpha_{eT}(W-x)]dx}{\int_0^W \Delta n_0 \exp(-\alpha_s x)dx}$$

$$= \frac{\alpha_s \exp(-\alpha_{eT}W)}{\alpha_s - \alpha_{eT}} \cdot \frac{1-\exp[-(\alpha_s - \alpha_{eT})W]}{1-\exp(-\alpha_s W)} \tag{15}$$

Figure 5:
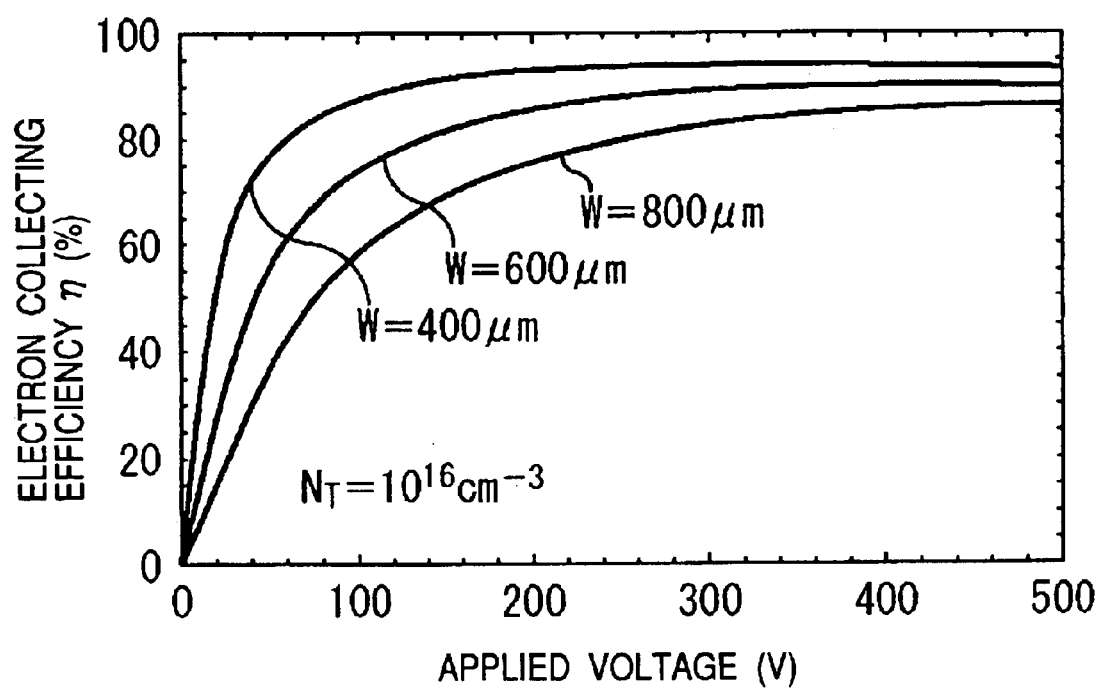
FIG. 5 is a graph showing an example of the relation between an electron collecting efficiency of the X-ray sensor and voltage applied to the depletion layer.

FIG. 5 shows the calculated results of the equation (15) as the function of voltage applied to the X-ray sensor. The parameter used for the graph of FIG. 5 is a depletion layer width W. The higher the voltage applied to the X-ray sensor, the higher the electron collecting efficiency $\eta$ becomes. The reason for this is if the high voltage is applied to the X-ray sensor, the attenuation coefficient $\alpha_{eT}$ becomes smaller.

As an electron is trapped at the trap level ($E_T$), the number of electrons reaching the electrode reduces. Therefore, in order to increase the electron capturing efficiency $\eta$, it is desired that the concentration $N_T$ of the trap level ($E_T$) be as small as possible.

It is also desired that the drift speed $V_{ed}$ is as fast as possible in order to allow electrons to reach the electrode before they are trapped at the trap level $E_T$.

It can be understood from the results shown in FIG. 5 that if the concentration $N_T$ of trap levels $E_T$ is $10^{16}$ cm$^{-3}$ and the depletion layer width W is 600 μm, the electron capturing efficiency $\eta$ becomes 50% or higher if the applied voltage is set to 42 V (electric field of 0.7 kV/cm) or higher.

A preferred bias range was calculated from the graphs of FIGS. 3 to 5. If an electric field of 18.2857+0.87 W+0.000321429 W$^2$ kV/cm≦E≦2.45 kV/cm is applied, where W is a depletion layer width, a carrier capturing efficiency posing no problem in an ordinary operation can be achieved without increasing a dark current.

Absorption of X-rays and γ-rays in semiconductor of the radiation detector shown in FIG. 1 is determined by three mechanisms, the photoelectric effect, Compton scattering and electron pair generation.

Figure 6:
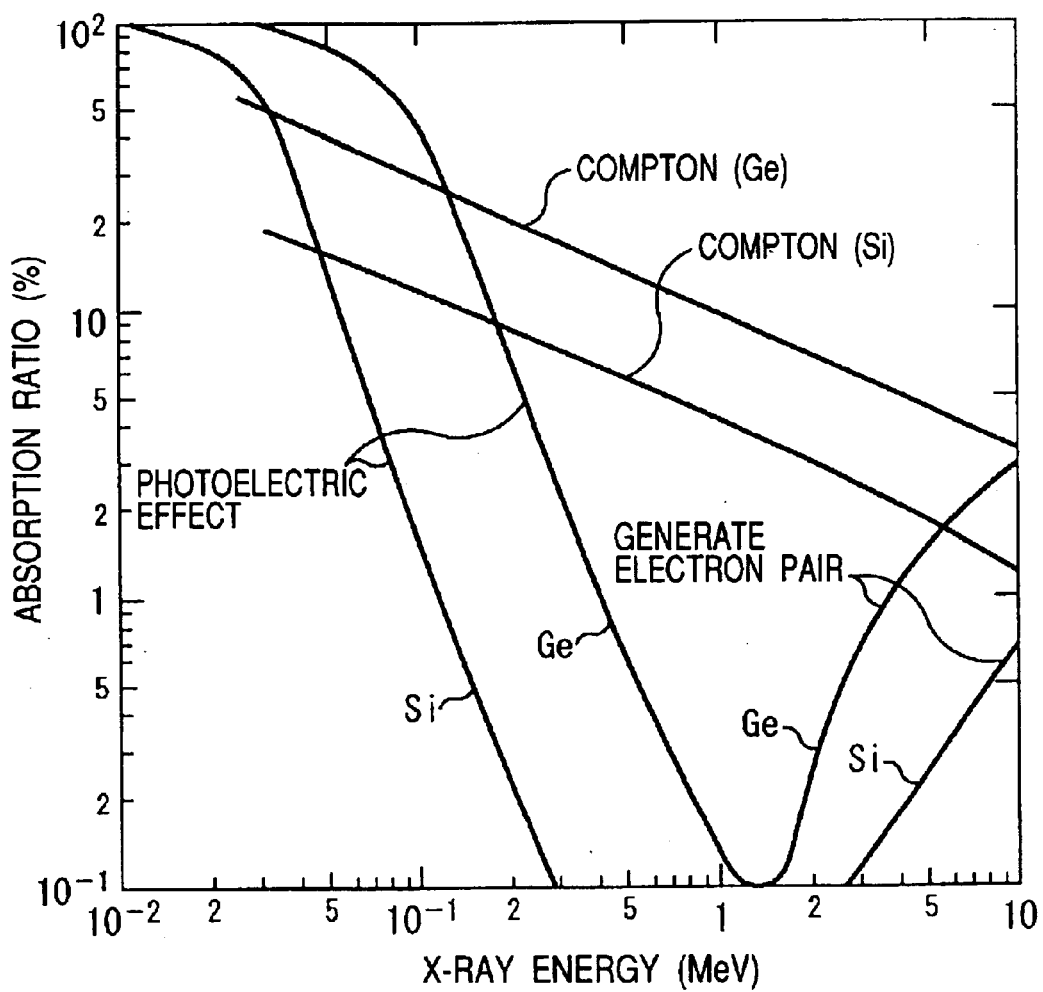
FIG. 6 is a graph showing an example of the relation between an X-ray energy and an X-ray absorption ratio in Si and Ge detectors.

FIG. 6 shows an example of radiation absorption ratios of X-ray energy by Si and Ge detectors.

X-rays of 0.1 MeV or lower is often used for medical and analytical applications. In these applications, absorption by semiconductor is determined mainly by the photoelectric effect.

While radiation is detected by a pn or pin junction of semiconductor, a dark current by diffusion current flows. This dark current is dependent upon a band gap energy as shown in FIG. 8.

Figure 8:
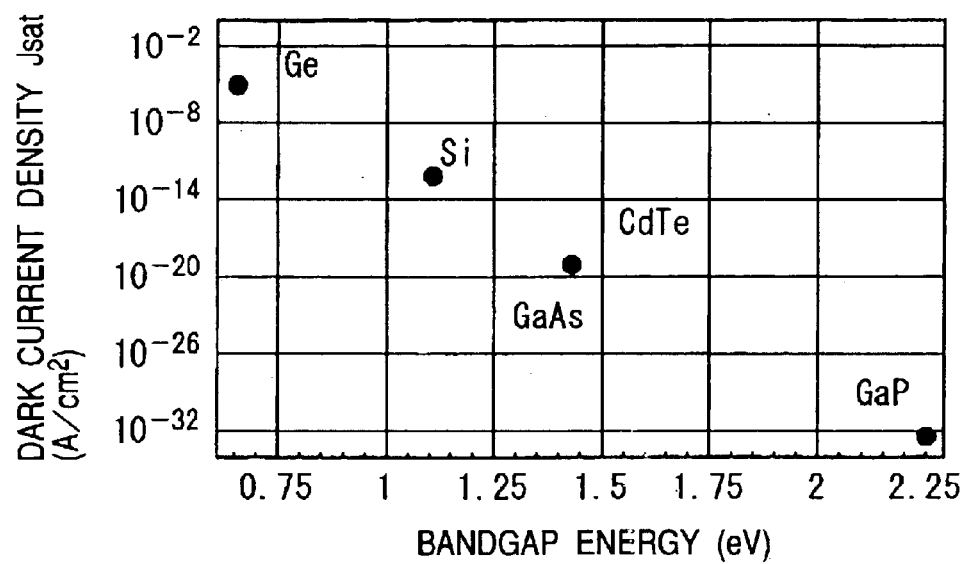
FIG. 8 is a graph showing an example of the relation between band gap energy and dark current caused by minority carriers in a semiconductor pn or pin junction.

As seen from the graph of FIG. 8, if the band gap energy is smaller than 1 eV, a dark current density $J_{sat}$ by diffusion current becomes $10^{-10}$ A/cm$^2$ or larger even at a room temperature.

The noise characteristics are therefore degraded and specific countermeasure is required. Generally, the material having a larger atomic number has a large absorption coefficient of X-rays. Desired radiation detecting material is therefore the material having a band gap energy of 1 eV or larger, a small dark current of a pin junction, a large atomic number and a large absorption coefficient of X-rays. From this view-point, GaAs, GaP and the like are more preferable than Si as radiation detecting material.

As shown in FIG. 6, Si has a relatively small absorption coefficient so that it can be used for low energy application.

Figure 7:
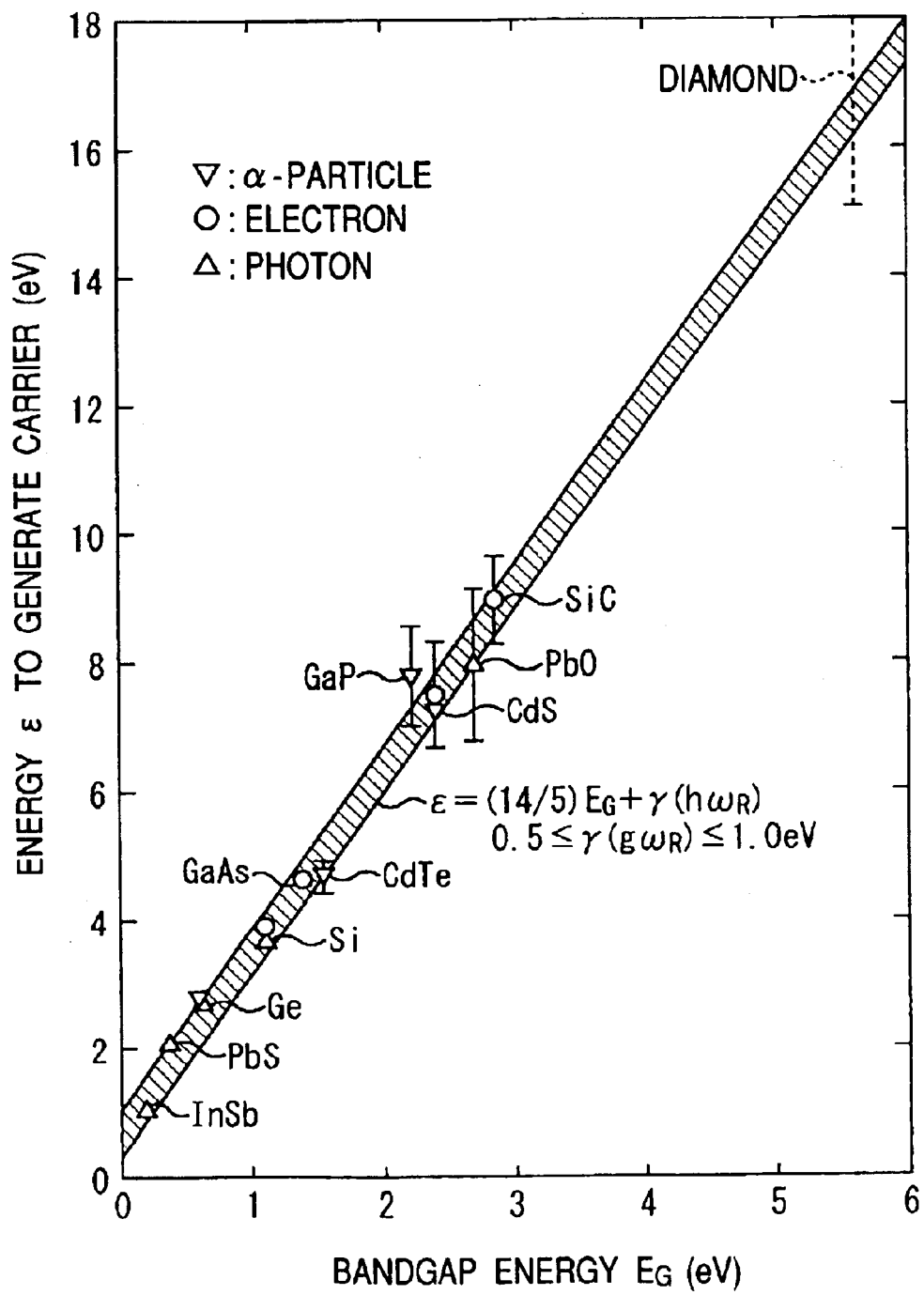
FIG. 7 is a graph showing an example of radiation energies necessary for generating carriers in semiconductor material.

FIG. 7 shows radiation energies necessary for generating carriers when radioactive rays are irradiated to semiconductor. The abscissa represents a band gap energy $E_G$ and the ordinate represents an energy $\epsilon$ necessary for generating carriers.

Assuming that a radiation energy is constant, the material having a small energy necessary for generating carriers is preferable because a number of carriers can be generated.

Referring to FIG. 7, the energy necessary for generating carriers is about 5 eV in the case of GaAs and CdTe. In this case, therefore, X-rays of 50 keV can generate 10,000 carrier pairs.

The band gap of GaAs and CdTe is larger than 1 eV, has a small energy $\epsilon$ (eV) necessary for generating carriers and a large absorption coefficient of X-rays. GaAs and CdTe are therefore preferable as the X-ray detecting material.

GaAs is preferable as the X-ray detecting material because its crystallinity is almost perfect and a dark current is small. The X-ray absorption characteristics of GaAs are almost similar to those of Ge. From these characteristics, GaAs is suitable for medical applications having a limited dose of X-rays. The productivity of GaAs is presently good similar to Si and GaAs is most suitable from an economical viewpoint.

In the radiation detector shown in FIG. 1, the n-layer 30 and p-layer 10 have a very low sensitivity of radioactive rays (X-rays). Only the depleted region in the i-layer 20 can effectively convert radioactive rays into carriers.

Figure 9:
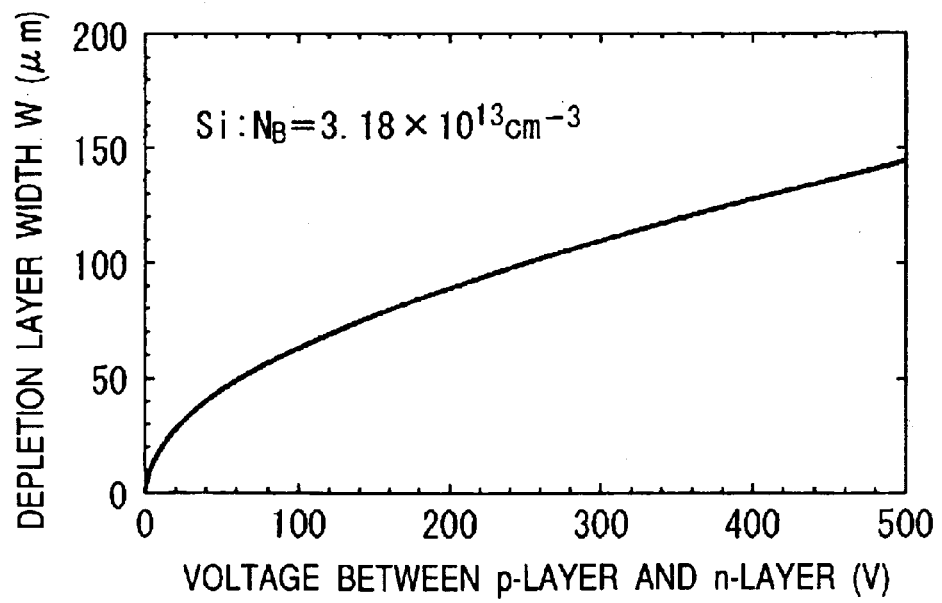
FIG. 9 is a graph showing an example of the relation between a depletion layer thickness of Si and voltage applied to the depletion layer.

FIG. 9 shows the relation between an applied voltage and a depletion layer thickness of Si when a background electron concentration $N_B$ of the i-layer is set to $3.18 \times 10^{13}$ cm$^{-3}$. It can be understood from this graph that the depletion layer width widens only about 150 μm even if a voltage of 500 V is applied.

Figure 10:
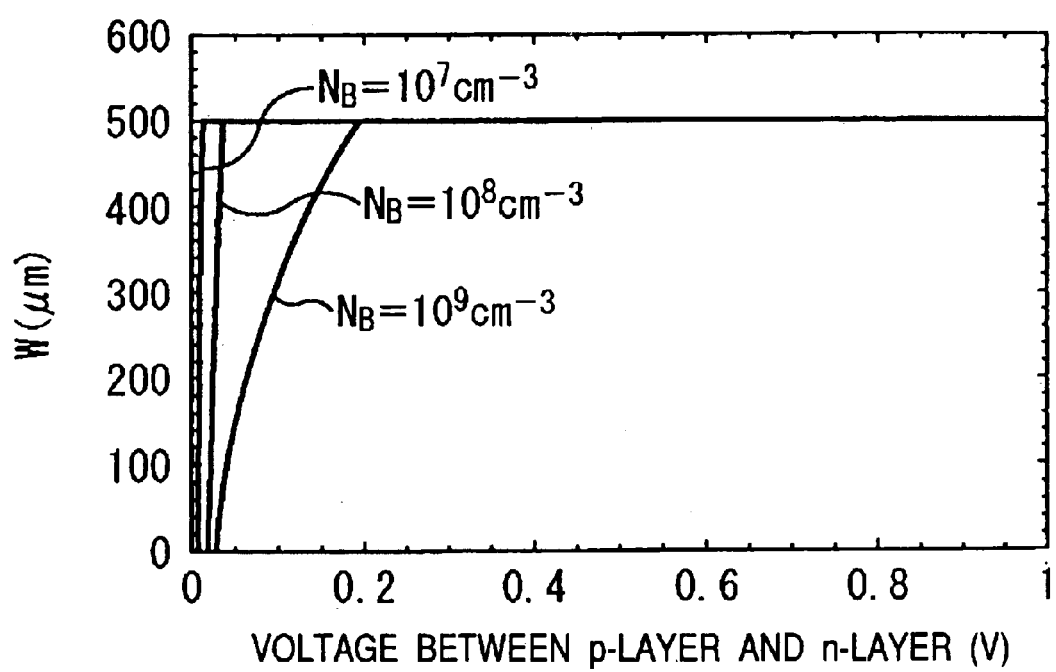
FIG. 10 is a graph showing an example of the relation between a depletion layer thickness of GaAs and voltage applied to the depletion layer.

In contrast, a GaAs wafer having the i-layer background electron concentration $N_B$ of $10^7$ cm$^{-3}$ can be manufactured. Therefore, as shown in FIG. 10, as compared to Si, a thick depletion layer can be formed at a lower voltage and the high sensitivity can be realized.

Since GaAs has the X-ray absorption characteristics similar to Ge, it is suitable for X-ray detecting material.

As described above, according to the radiation detector of this embodiment, an electric field is applied in the range from a lower limit electric field which satisfies the lower limit of the specification value $\eta_0$ of the carrier capturing efficiency to an upper limit electric field which satisfies the upper limit of the specification value $J_0$ of the dark current density. Therefore, radioactive rays can be detected with small noises and at a high sensitivity. The embodiment is particularly suitable for application to a radiation detector of a conductivity modulation type.

Figure 11:
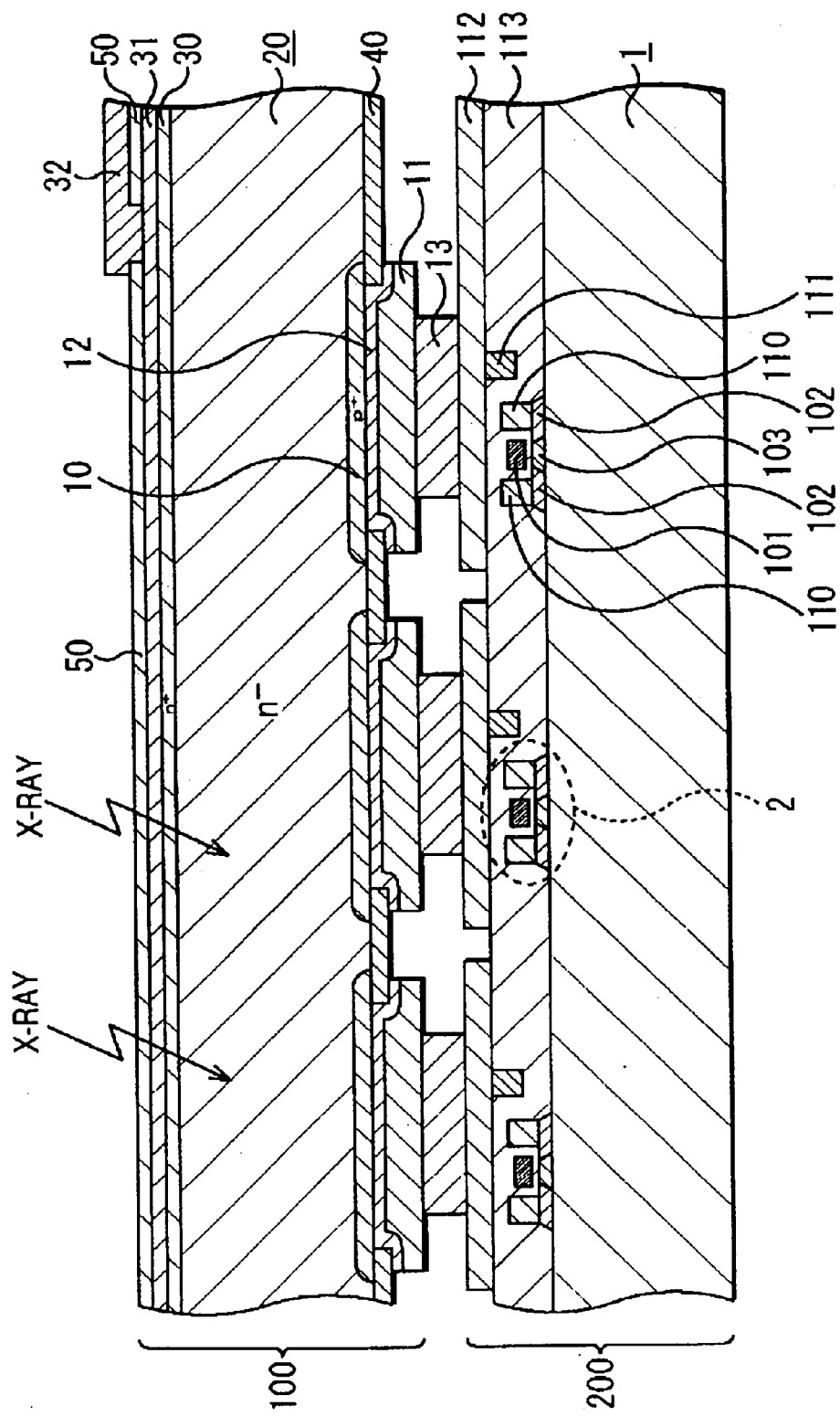
FIG. 11 is a simplified cross sectional view showing an example of an X-ray sensor according to an embodiment of the invention.

Next, an example of an X-ray sensor built in a radiation imaging system will be described. FIG. 11 is a simplified cross sectional view of an X-ray sensor according to an embodiment.

In FIG. 11, reference numeral 100 represents an X-ray sensing unit which corresponds to the above-described radiation detector and generates electrons and holes as X-rays are irradiated. Ones of the carriers generated by the X-ray sensing unit 100 are accumulated and read as a signal which contains image information.

Reference numeral 200 represents a carrier reading unit having an insulating substrate 1 on which transistors 2 and the like are formed. The X-ray sensing unit 100 is made of semiconductor such as GaAs, GaP, Ge and Si. The X-ray sensing unit 100 has: a pin diode constituted of a p$^+$-layer 10, an i-layer (n$^-$-layer) 20 and an n$^+$-layer 30 and having a depletion layer extending from the interface between the p$^+$-layer 10 and i-layer 20; metal layers 31 and 32 formed on the n$^+$-layer 30; and metal layers 11 and 12 formed on the bottom of the p$^+$-layer 10.

The metal layer 12 is a barrier metal layer. Reference numerals 40 and 50 represent protective films. The X-ray sensing unit 100 can be formed on a single crystal substrate of semiconductor described above.

The reading unit 200 has transistors 2 constituting a circuit and formed on the insulating substrate 1. The transistor 2 has a gate 101, a pair of source and drain 102, an active layer 103 and metal wires 110 connected to the source and drain.

The transistor 2 is covered with a protective film 113. As the semiconductor material of a thin film transistor, material which is not a single crystal is suitable, such as amorphous silicon, polysilicon, and micro crystal silicon.

These materials can be formed on a large area glass substrate at a low temperature of 400° C. or lower. Therefore, these materials are optimum for a radiation imaging system having a large sensor plane using a large area substrate.

Reference numeral 111 represents an Al layer, and reference numeral 112 represents a metal layer. Although not shown in FIG. 11, the reading unit 200 has also capacitors.

The metal layer 112 of the reading unit 200 and the metal layer 11 of the X-ray sensing unit 100 are connected by a bump metal 13.

Figure 12:
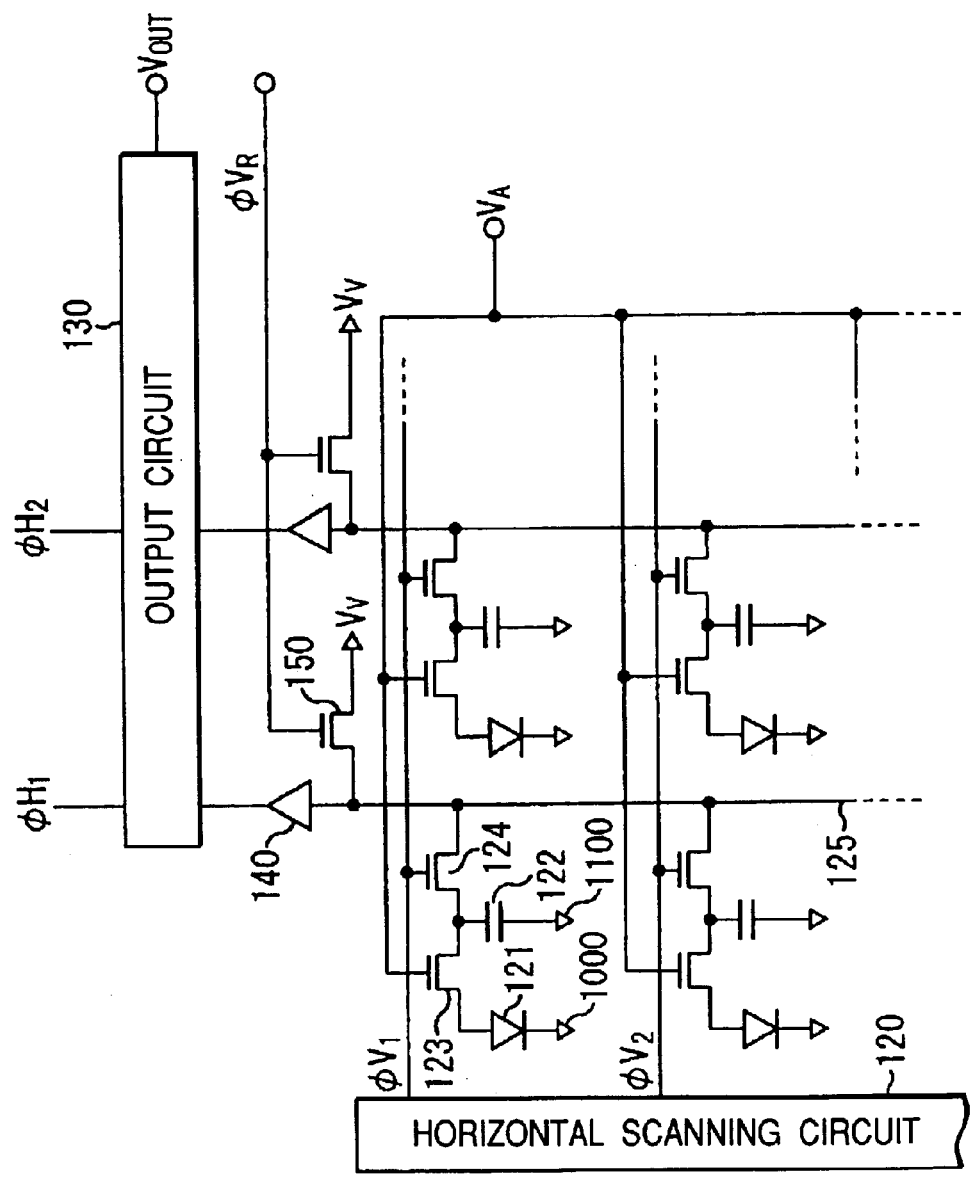
FIG. 12 is a simplified equivalent circuit diagram of a radiation imaging system according to an embodiment of the invention.
Figure 31A:
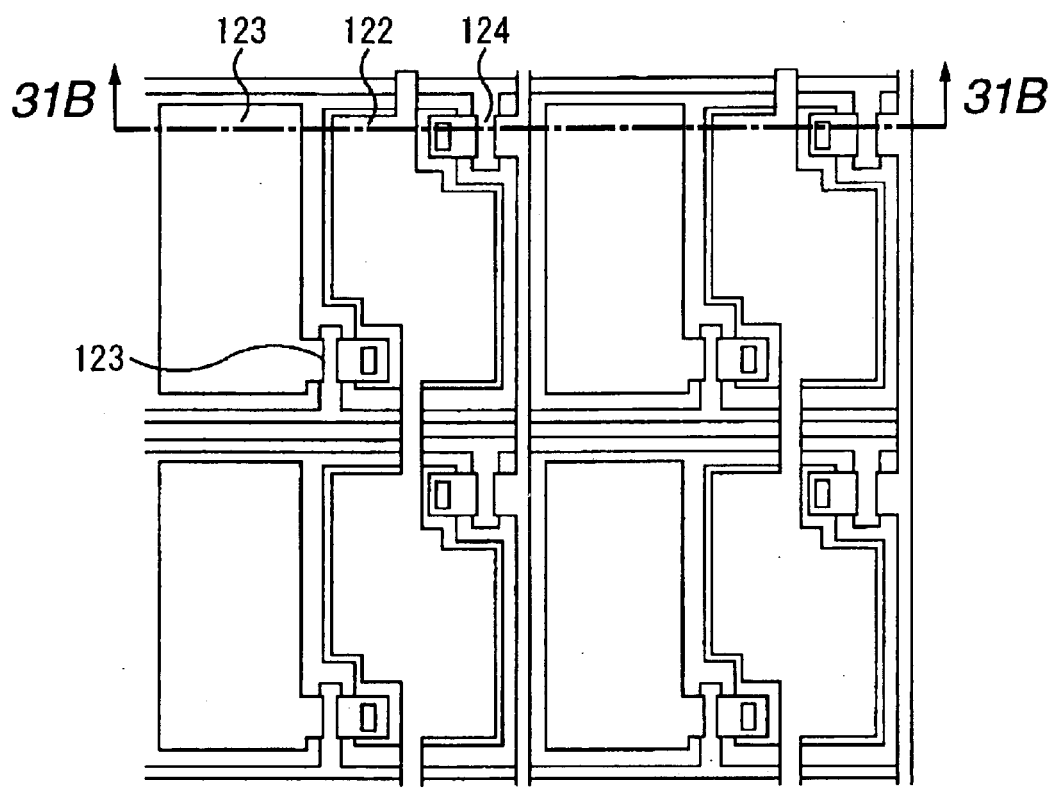
FIGS. 31A and 31B are diagrams showing an example of the structure of a radiation imaging system according to an embodiment of the invention.
Figure 31B:
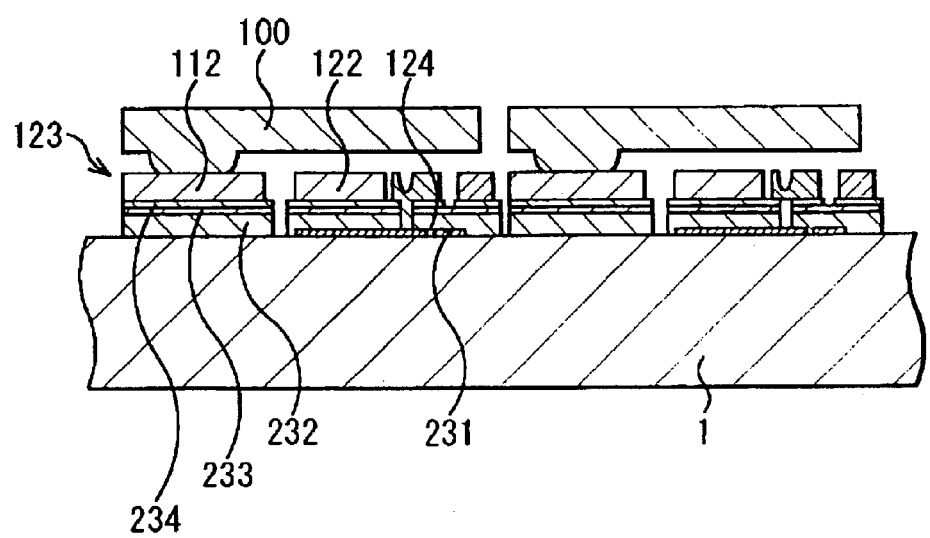

The transistor 2 shown in FIG. 11 corresponds to a transistor 124 shown in the simplified equivalent circuit diagram of FIG. 12. FIG. 31A is a schematic plan view showing another example of the reading unit 200, and FIG. 31B is a schematic cross sectional view taken along line 31B–31B' shown in FIG. 31A.

Elements designated by reference numerals shown in FIG. 31A will be described with reference to FIG. 12. FIG. 12 is a simplified equivalent circuit diagram showing an example of the X-ray imaging system of this embodiment.

Referring to FIG. 12, a unit cell as an input pixel has: an X-ray sensor cell 121 as a charge conversion means; an accumulation capacitor 122 as a charge accumulation means; a first transistor 123 as an electric field control means for transferring a signal from the X-ray sensor cell 121 to the accumulation capacitor 122; and a second transistor 124 as a read means for reading a signal from the accumulation capacitor 122.

As shown in FIG. 12, the unit cells are disposed along vertical and horizontal directions at predetermined pitches, i.e, in a matrix shape. As described above, the first transistor 123 is the control means for controlling an electric field to be applied to the X-ray sensor cell 121.

A sensor potential fixing means 1000 (bias means 65) is connected to the other terminal of the X-ray sensor cell 121 not connected to the first transistor 123 to apply a desired potential to the other terminal. An accumulation potential fixing means 1100 is connected to the other terminal of the accumulation capacitor 122 not connected to the first and second transistors 123 and 124 to fix the potential at the other terminal.

A horizontal scanning circuit (scan means such as shift registers) 120 selects the second transistors 124 of unit cells of each row. A signal is read from the accumulation capacitor 122 of each unit cell to an output line 125. This signal is input to an output circuit 130 via an amplifier 140 connected to the output line 125. The output circuit 130 sequentially outputs signals of respective rows.

Each output line 125 is set to a potential $V_r$ by an output line reset transistor 150 as a switch means. The output circuit 130 is constituted of accumulation capacitors (not shown) provided for each output line and transistors (not shown) for connecting each accumulation capacitor and each common output line. Signals $\phi H1$, $\phi H2$, . . . are sequentially input from a scanning circuit (not shown) to the output circuit 130 to turn on the transistors so that signals from the accumulation capacitors (not shown) of respective columns are read to and output from the common output line.

Next, another example of the reading unit shown in FIGS. 31A and 31B will be described with reference to FIGS. 31A and 31B. On an insulating substrate 1 such as a glass substrate, a lower electrode 231, an insulating film (silicon nitride film) 232, high resistance amorphous silicon 233, n$^+$-amorphous silicon 234 and an upper electrode layer (metal layer) 112 are formed in this order.

As shown, the thin film transistors 123 and 124 and accumulation capacitor 122 are made of the same lamination film. Since the same lamination film is used, the manufacture process time can be shortened, the manufacture cost can be made low, and the manufacture yield can be improved.

The metal layer 112 is one of the main electrodes of the transistor 123. The X-ray sensing unit 100 is electrically connected to the metal layer 112. In this example, a sensing unit separated for each pixel is shown.

The thin film transistor circuit unit formed on the insulating substrate 1 and made of material which is not a single crystal is made of thin films so that a large insulating substrate can be formed easily.

Since a thin film transistor has a thin active layer (usually, 0.5 $\mu$m or thinner), a probability of radiation absorption is low, a problem of material damages by some radioactive rays transmitted through the X-ray sensing unit 100 as the radiation detector is not likely to occur, and radioactive rays are hardly absorbed in the reading circuit. Therefore, noises are hard to be generated. Since the noise characteristics are excellent, a high reliability X-ray imaging system can be realized by forming the circuit unit with thin film transistors.

By forming the lamination structure of the X-ray sensing unit 100 and read circuit unit 200, the X-ray sensing unit 100 can have an aperture efficiency of 100%. By forming only the reading circuit on the insulating substrate, it is not necessary to prepare the area for an X-ray incidence region.

It is therefore possible to form a sufficient gate width of a thin film transistor and realize a high speed operation of the thin film transistor. Reading information at 30 FPS (reading thirty frames per sec: frame/sec) to 60 FPS can be achieved although depending upon the semiconductor characteristics and the number of pixels.

Figure 13A:
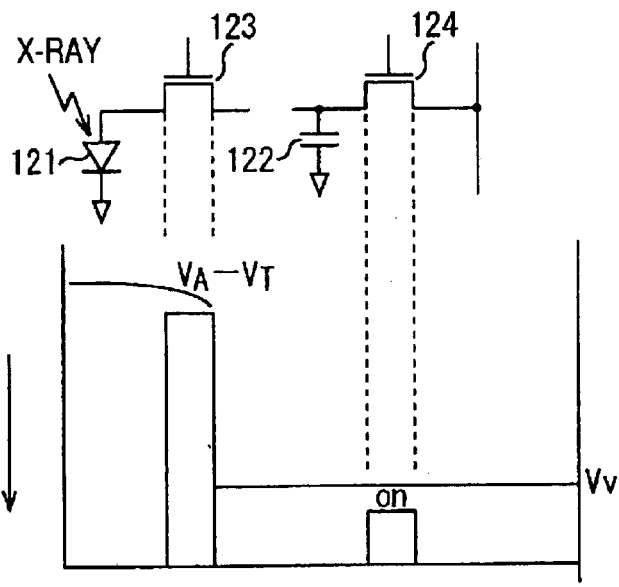
FIGS. 13A, 13B, 13C and 13D are diagrams illustrating a unit cell of the radiation imaging system.
Figure 13B:
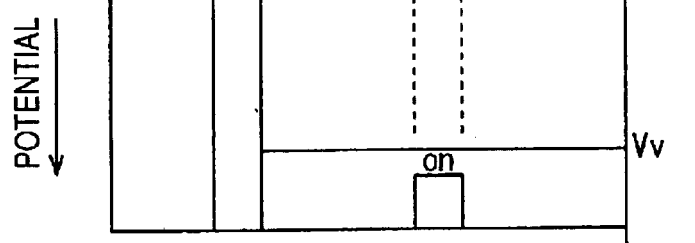
Figure 13C:
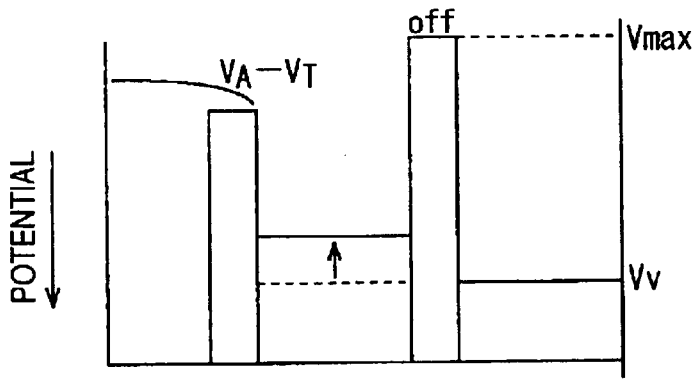
Figure 13D:
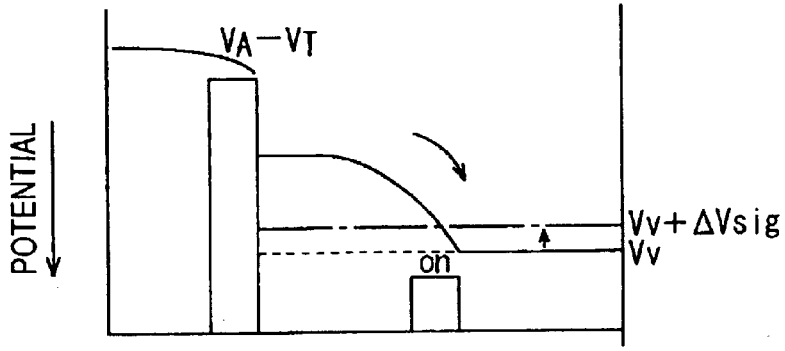

FIG. 13A is an equivalent circuit diagram of a unit cell of the X-ray imaging system. FIGS. 13B to 13D are simplified potential diagrams illustrating the operation of a unit cell of the X-ray imaging system. In FIGS. 13B to 13D, the abscissa represents the position of the unit cell and the ordinate represents a potential at each position.

FIG. 13B is a potential diagram in a sensor reset state. When the second transistor 124 and output line reset transistor 150 shown in FIG. 12 turn on, the potential of the accumulation capacitor 122 takes a reset voltage $V_V$ as shown in FIG. 13B.

While a constant voltage $V_A$ is applied to the gate of the first transistor 123, the first transistor 123 always takes a potential of $(V_A-V_T)$. $V_T$ is a threshold voltage of the transistor 123.

FIG. 13C is a potential diagram in a signal accumulation state. As X-rays are irradiated to the sensor cell 121 in an off-state period of the second transistor 124, carriers are generated in the sensor cell 121. The carriers are accumulated in the accumulation capacitor 122 via the transistor 123 so that the potential of the accumulation capacitor 122 changes from the potential $V_V$.

FIG. 13D is a potential diagram in a read state. As the second transistor 124 turns on in the state that the output line reset transistor 150 turns off, charges accumulated in the accumulation capacitor 122 are read to the output line 125. In principle, the above-described operations of sensor reset, signal accumulation and read are repeated.

Figure 14:
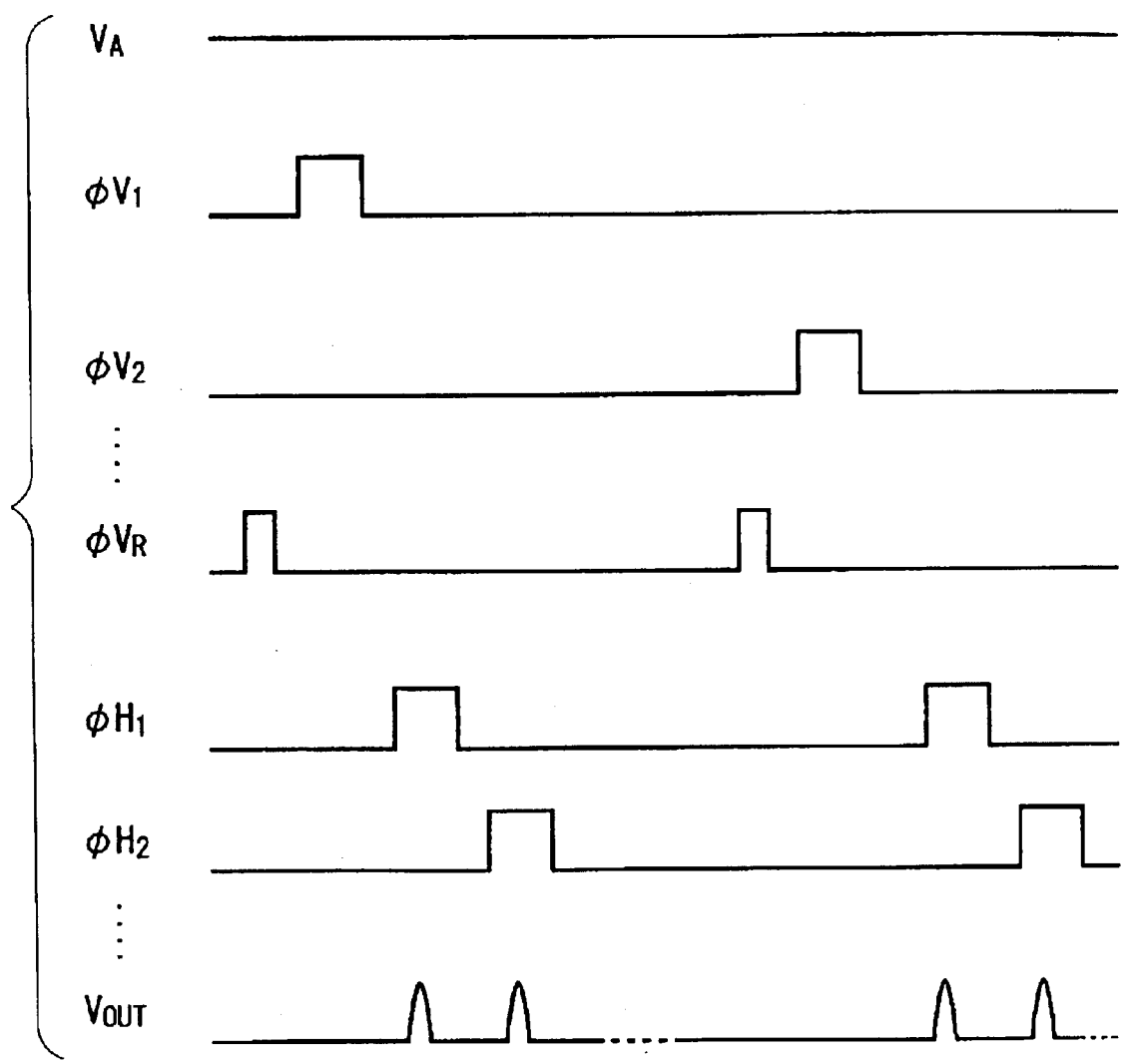
FIG. 14 is a timing chart illustrating an example of the operation of the radiation imaging system.

FIG. 14 is a timing chart explaining an example of driving the X-ray imaging system of this embodiment. Voltage applied to the gate of the first transistor 123 is a constant voltage (voltage $V_A$).

After the output line 125 is reset (reset potential $V_V$) by turning on the output line reset transistor 150 by setting φVR to $V_R$, the horizontal scanning circuit 120 applies a pulse φV1 to read a signal stored in the accumulation capacitor 122 to each output line 125. Each horizontal scanning is performed by φH2, φH3 . . . to sequential output $V_{out}$ from the output circuit 130.

Figure 15:
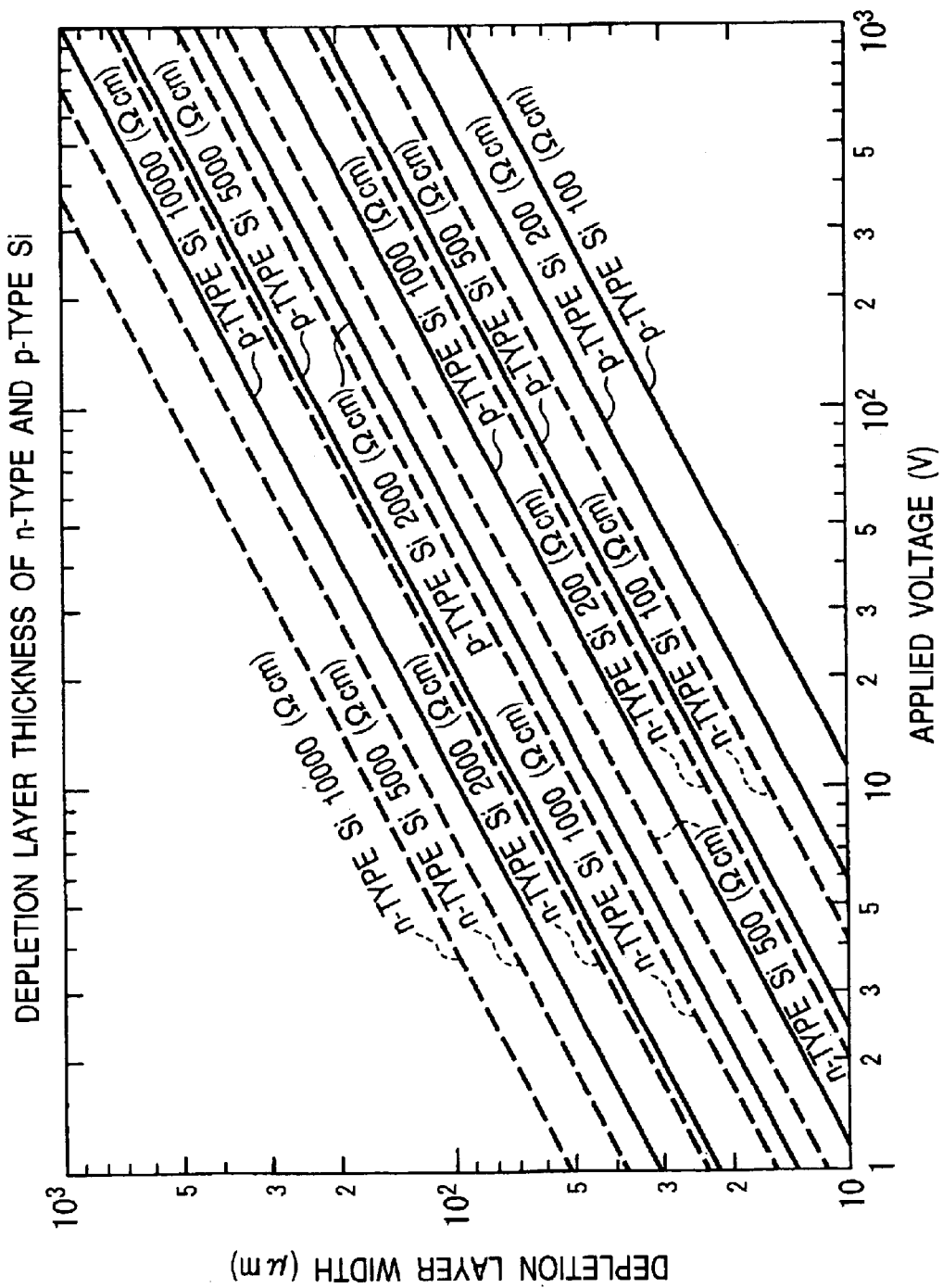
FIG. 15 is a graph showing an example of the relation between an applied voltage and a depletion layer thickness of Si.

FIG. 15 shows the relation between an applied voltage and a depletion layer thickness by using a resistivity of n- or p-type Si as a parameter. The applied voltage is preferably set to 10 V or higher or more preferably 100 V or higher for the resistivity of 100 Ω·cm. In order to obtain a depletion layer having a thickness of about 1 mm, an applied voltage of 1000 V or higher is required.

A GaAs wafer having a resistivity of $10^7$ Ω·cm can be manufactured. As compared to Si, a thicker depletion layer can be formed so that a high sensitivity can be obtained. Since GaAs has the X-ray absorption characteristics similar to Ge, GaAs is suitable for X-ray detecting material.

Although a voltage of 1000 V or higher is applied to the terminal 1000 shown in FIG. 12 for Si, a lower voltage is applied for GaAs.

While the constant voltage $V_A$ is applied to the first transistor (thin film transistor: TFT) 123, one electrode of the X-ray sensor cell 121 is always applied with a voltage of $(V_A-V_T)$. Therefore, a constant voltage is always applied to the X-ray sensor cell 121 and the thickness of the depletion layer does not change. It is therefore possible to maintain a linearity of the radiation read sensitivity and a stable operation of the X-ray imaging system.

Figure 16:
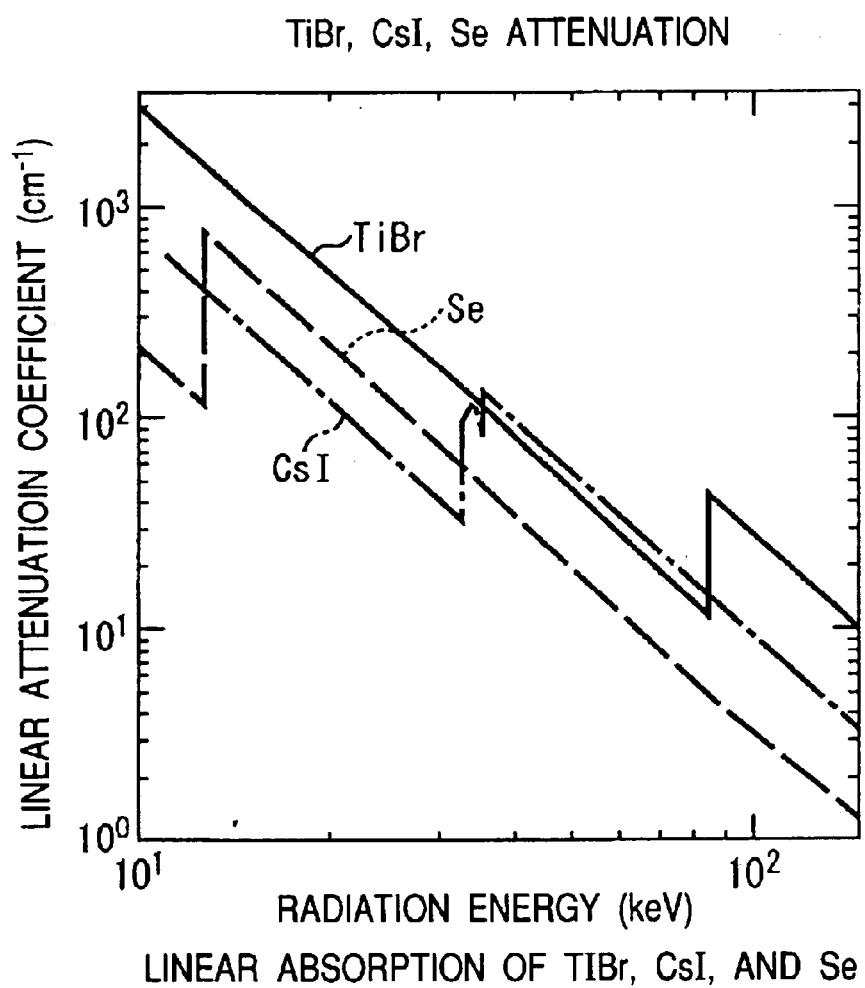
FIG. 16 is a graph showing an example of the X-ray absorption characteristics of TiBr, CsI and Se.
Figure 32:
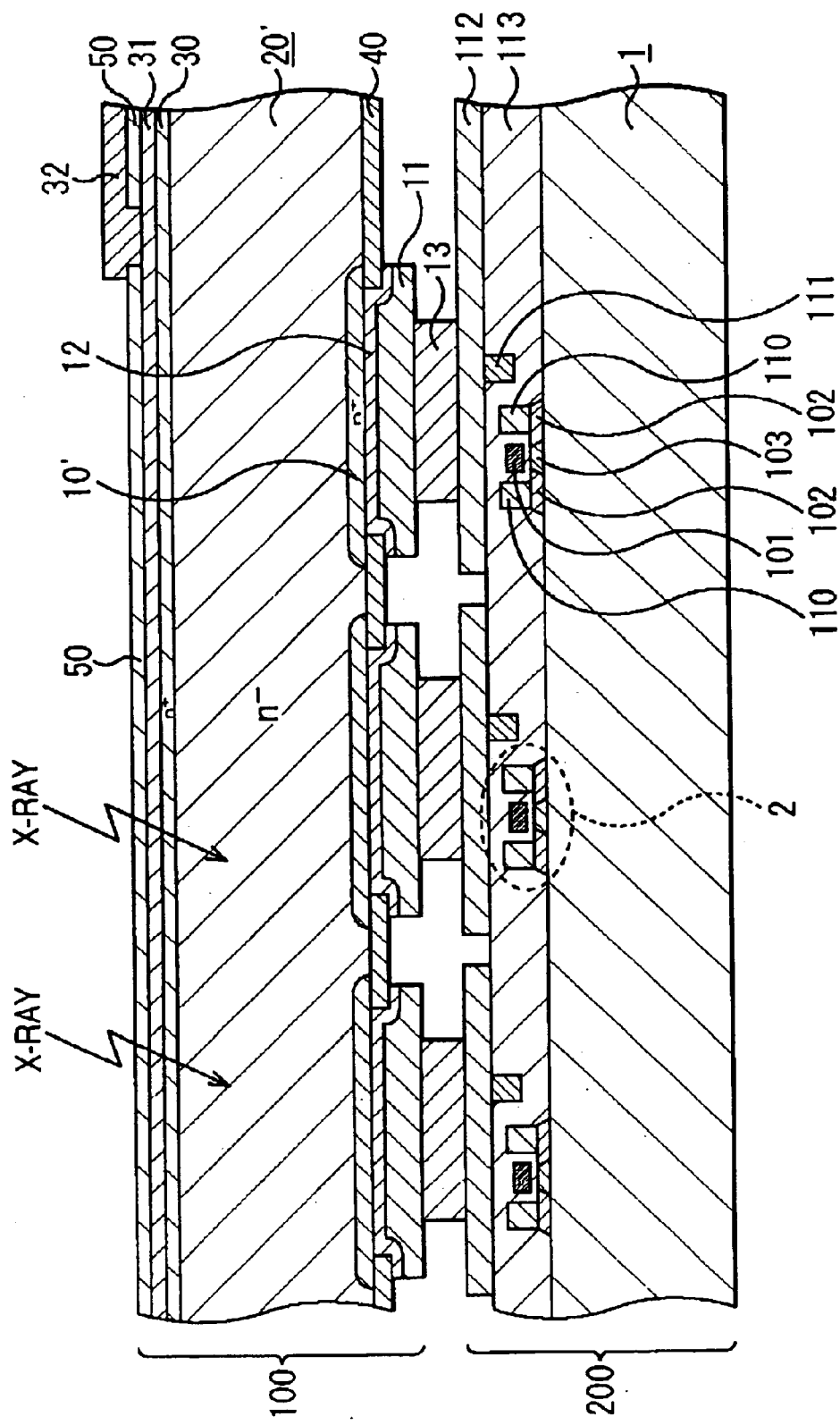
FIG. 32 is a simplified cross sectional view of an X-ray sensor which uses single crystal as a high resistance X-ray detector unit according to an embodiment of the invention.

FIG. 16 is a graph showing the X-ray absorption characteristics of TiBr, CsI and Se. FIG. 32 shows an example of using single crystal semiconductor as the material of a high resistance X-ray detecting unit.

GaAs is particularly excellent as the material of the single crystal high resistance unit 20' because GaAs has a high resistivity (>$10^7$ Ω·cm), a small dark current (band gap 1.5 eV or smaller) and a large diameter wafer (6 inches φ). Reference symbol 10' represents an $n^+$-layer.
(First Modification of X-ray Sensor)

Figure 17:
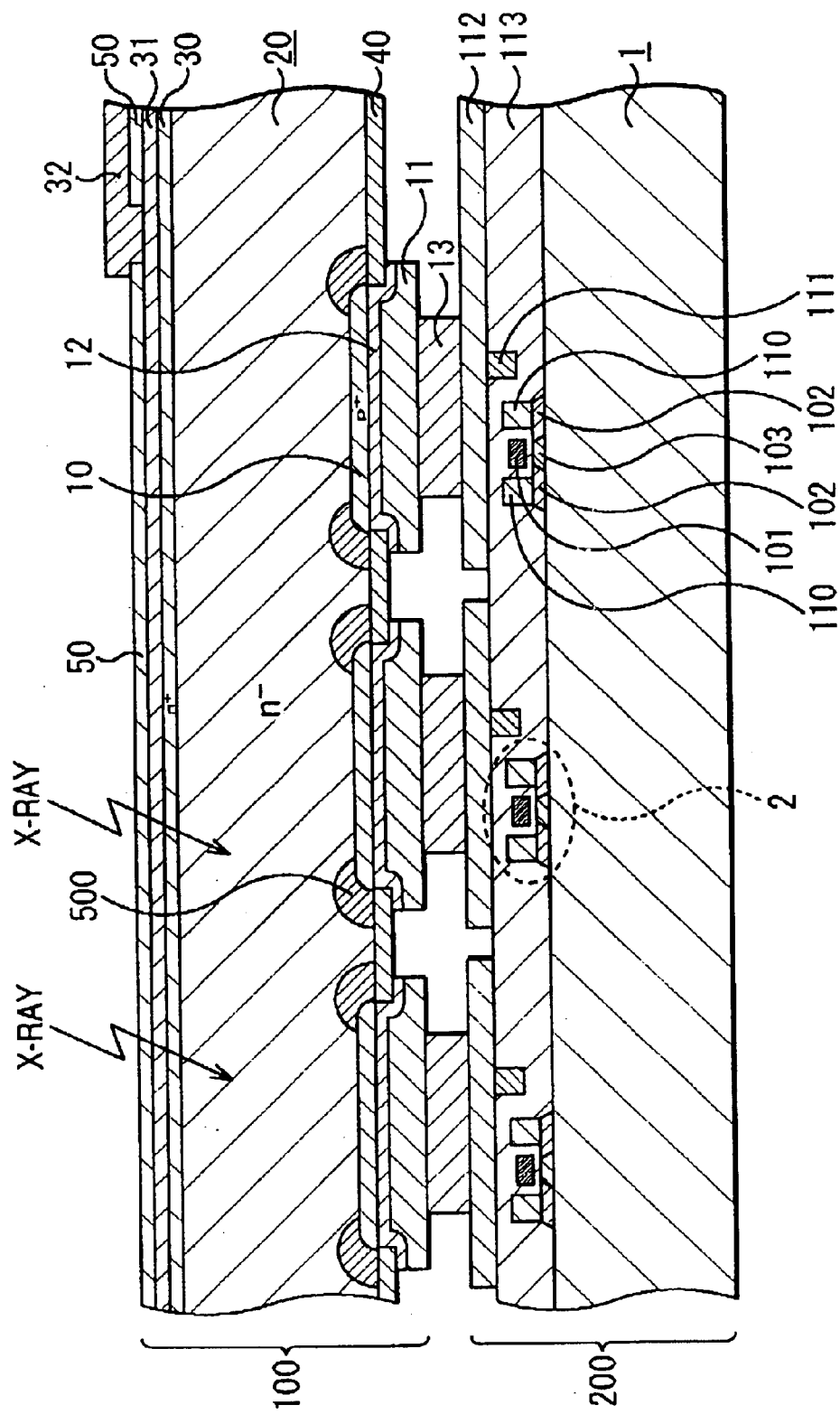
FIG. 17 is a simplified cross sectional view of a first modification of the X-ray sensor of the embodiment.

The X-ray sensor of the embodiment may have the structure shown in FIG. 17. FIG. 17 is a cross sectional view of the X-ray sensor of the first modification.

As shown in FIG. 17, the X-ray sensor of the first modification has a p-region (guard region) 500 having a concentration lower than $p^+$ and formed around the $p^{-+}$-layer 10. This p-region relaxes a peripheral sharp electric field to be generated when a high voltage is applied to the X-ray sensor, and can improve the breakdown voltage of the pn junction.
(Second Modification of X-ray Sensor)

Figure 18:
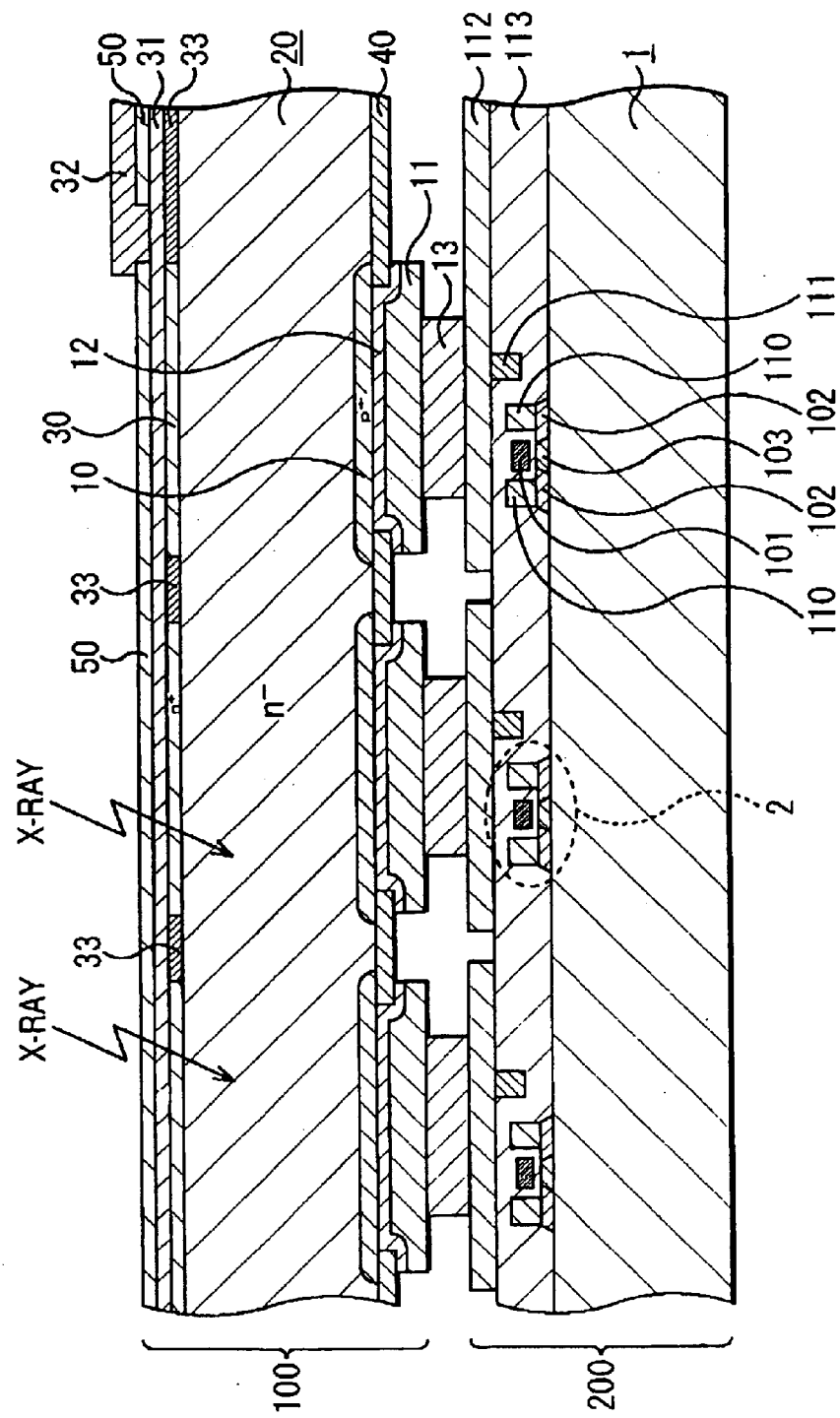
FIG. 18 is a simplified cross sectional view of a second modification of the X-ray sensor of the embodiment.

The X-ray sensor of the embodiment may have the structure shown in FIG. 18. FIG. 18 is a cross sectional view of the X-ray sensor of the second modification.

As shown in FIG. 18, in the X-ray sensor of the second embodiment, the upper $n^+$-region 30 is separated for each cell by an insulating film 33 to improve the resolution.
(Third Modification of X-ray Sensor)

Figure 19:
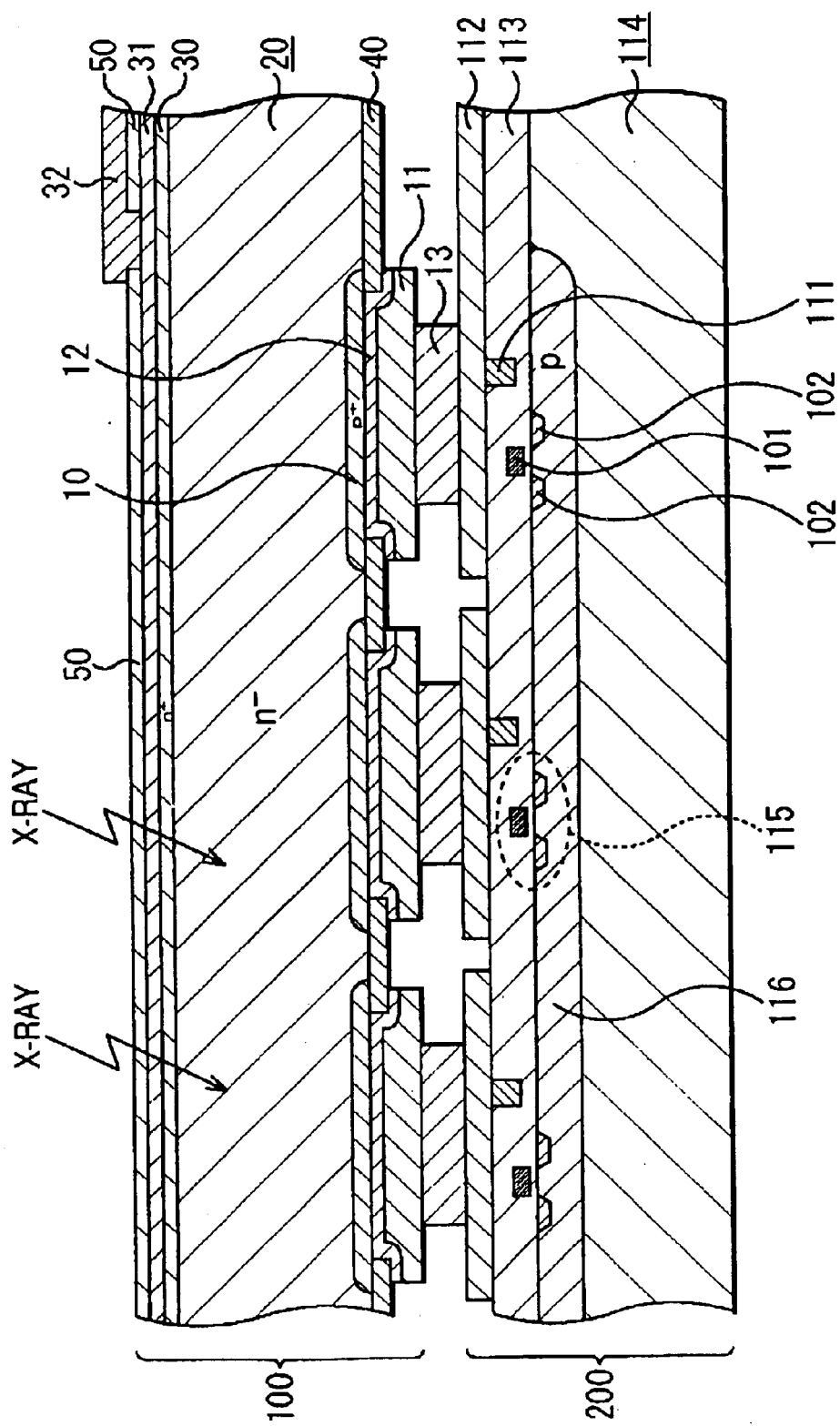
FIG. 19 is a simplified cross sectional view of a third modification of the X-ray sensor of the embodiment.

The X-ray sensor of the embodiment may have the structure shown in FIG. 19. FIG. 19 is a cross sectional view of the X-ray sensor of the third modification.

As shown in FIG. 19, in the X-ray sensor of the third modification, a single crystal substrate 114 is used as the lower substrate. By using the single crystal substrate, peripheral circuits can be implemented on the lower substrate so that a sophisticated function and a high speed read can be realized.

In the X-ray sensor shown in FIG. 19, n-type source and drain regions 102 are formed in the single crystal substrate 114 and a gate electrode 101 is formed on an insulating film on a p-region 116 to constitute a transistor 115.
(First Modification of X-ray Imaging System)

Figure 20:
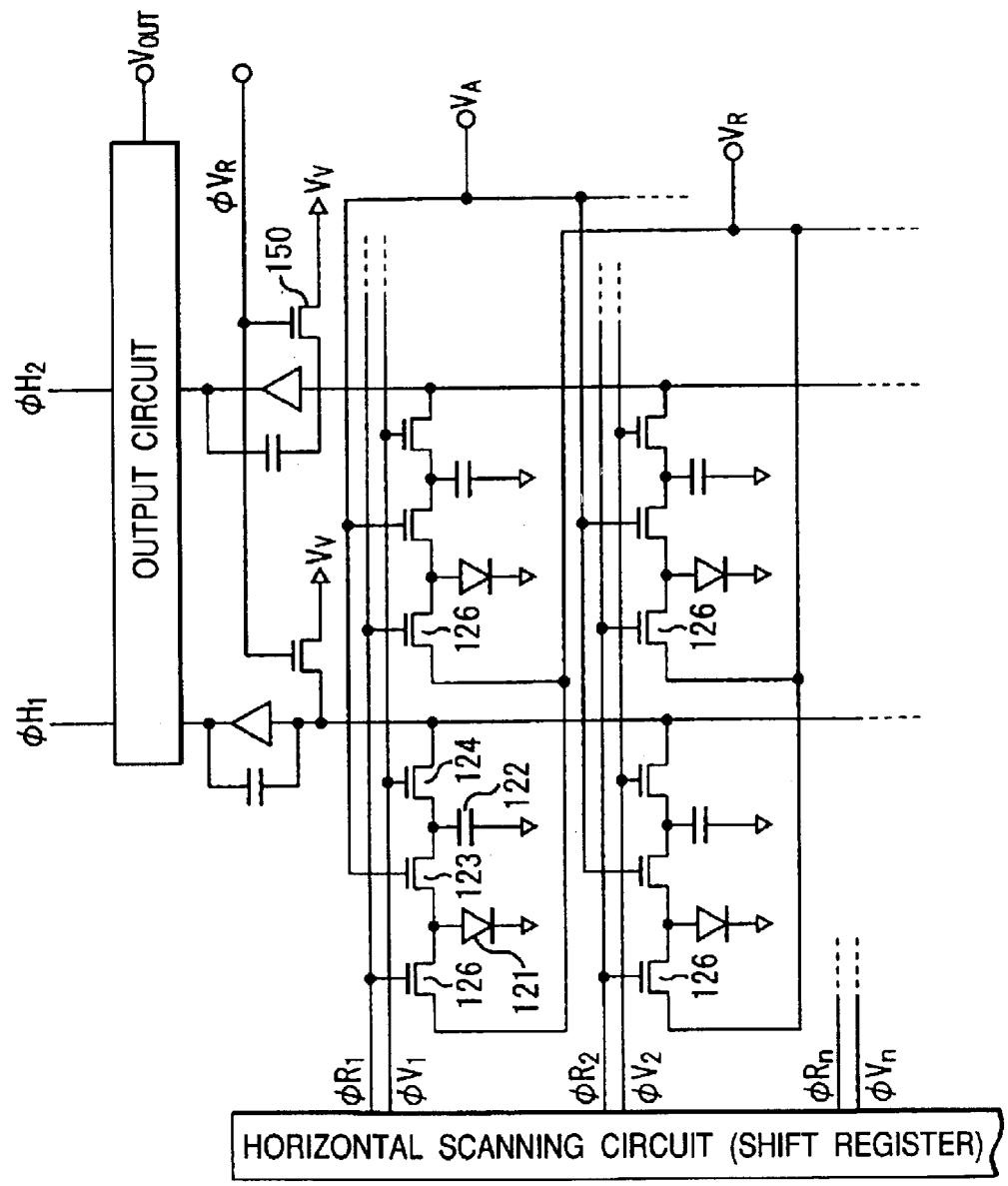
FIG. 20 is a simplified equivalent circuit diagram of a first modification of the radiation imaging system of the embodiment.

FIG. 20 is an equivalent circuit diagram of the first modification of the X-ray imaging system of the embodiment.

In the X-ray imaging system of the first modification shown in FIG. 20, a reset transistor 126 is connected to the X-ray sensor cell 121. This reset transistor (reset thin film transistor) 126 can mitigate an after image of the sensor.

By setting a reset voltage $V_{RS}$ slightly higher than $(V_A-V_T)$, the X-ray sensor with mitigated after images can be realized. The reset transistor 126 is a potential fixing means for fixing the potential of the X-ray sensor cell 121 for a predetermined period.

Figure 30:
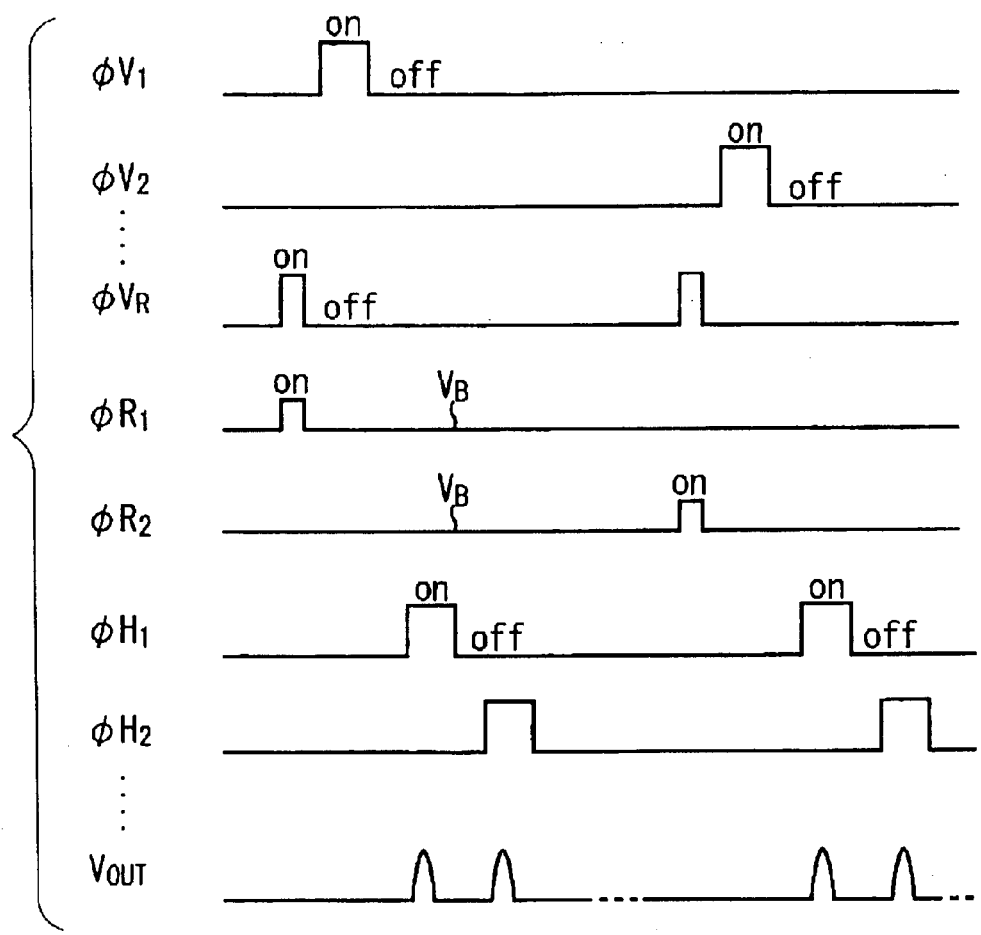
FIG. 30 is a timing chart illustrating an example of the operation of the first modification of the radiation imaging system of the embodiment.

FIG. 30 is a timing chart of the X-ray imaging system of the first modification shown in FIG. 20.

The sensor unit is reset by applying φR1, φR2 . . . and φV1, φV2 . . . synchronizing with φVR. When φR1, φR2 . . . is turned off, it is not completely turned off but a voltage $V_B$ is applied to the gate of the reset transistor 126.

With this setting, even if a strong input X-rays are irradiated to the sensor unit and large charges QLarge are accumulated in the accumulation capacitor 122 (capacitance C1), the voltage Vlarge (=QLarge/C1) will not become higher than ($V_B$-$V_{TH}$). It is therefore possible not to apply an excessive voltage to the switch transistor (second transistor) 124.

For example, the excessive voltage is a voltage higher than the maximum voltage (hereinafter called a signal accumulation maximum voltage) $V_{max}$ applied to the transistor 124 in the signal accumulation state shown in FIG. 13C.

If a voltage equal to or higher than the signal accumulation maximum voltage $V_{max}$ is applied across the accumulation capacitor 122, carriers flow toward the output side of the transistor 124 and the image is influenced greatly. The influence upon the image called blooming in CCD or the like can be eliminated if a voltage higher than the signal accumulation maximum voltage $V_{max}$ is not applied across the accumulation capacitor 122.

(Second, Third and Fourth Modifications of X-ray Imaging System)

Figure 21:
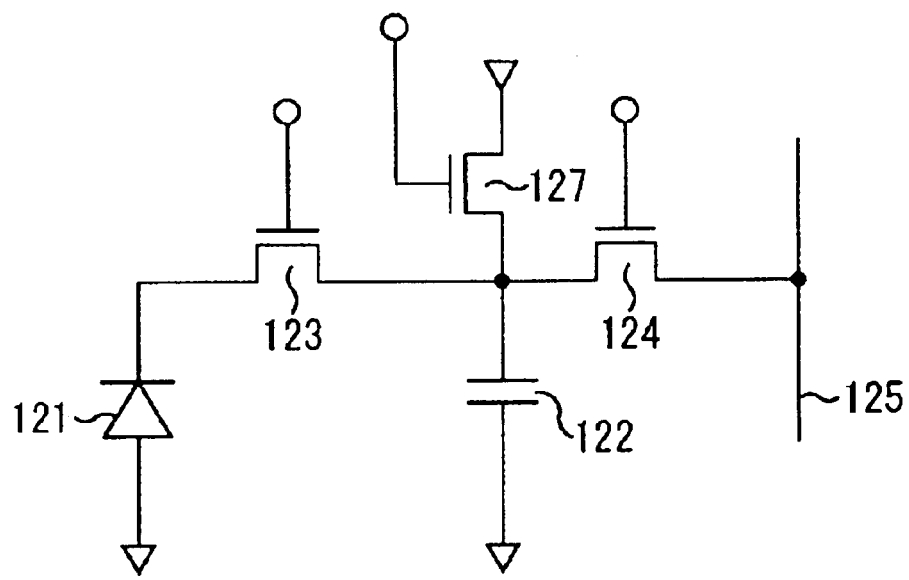
FIG. 21 is an equivalent circuit diagram of a unit cell of a second modification of the radiation imaging system of the embodiment.

FIG. 21 is an equivalent circuit diagram of a unit cell of the second modification of the X-ray imaging system wherein each accumulation capacitor 122 is provided with a reset switch 127 for resetting the accumulation capacitor 122.

Assuming that the operation of the switch transistor 127 is similar to that of the transistor 126 of the sensor shown in FIG. 20, if the voltage $V_B$ is applied to the switch transistor 127 during the off-period, a voltage equal to or higher than ($V_B$-$V_{TH}$) is not applied to the accumulation capacitor (capacitance C1) 122.

By preventing an overflow of carriers from the read transistor 124 into the accumulation capacitor 122, the characteristics of an image in a vertical direction can be improved.

If the amount of X-rays is sufficiently small, the voltage during the off-period may be a perfect off-potential. With this function, a protective function for an excessive X-ray input can be realized.

The switch transistor 127 can provide two functions of a reset switch and a protective circuit of carrier overflow.

Figure 22:
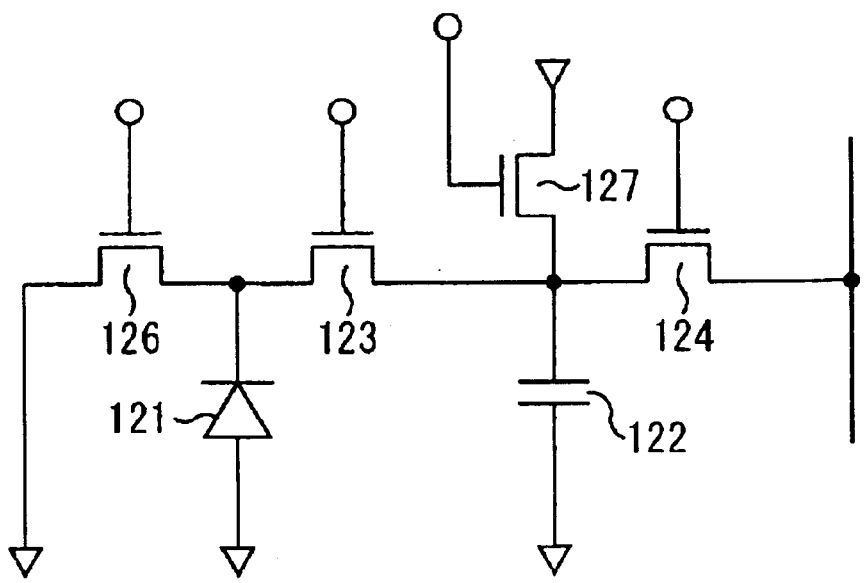
FIG. 22 is an equivalent circuit diagram of a unit cell of a third modification of the radiation imaging system of the embodiment.

FIG. 22 is an equivalent circuit diagram of a unit cell of the third modification of the X-ray imaging system wherein both transistors 126 and 127 are provided.

The following formula (16) is satisfied if the voltage $V_B$ applied to the gates of the transistors 126 and 127 are slightly higher than or nearly equal to the voltage $V_A$ applied to the gate of the first transistor 123.

$$(V_A - V_{TH126}) \cong (V_B - V_{TH123}) \qquad (16)$$

The sensor maximum accumulation charge $Q_{max}$ is given by the following equation (17).

$$Q\max = (V_A - V_{TH126} - V_v) \, C1 \qquad (17)$$

By changing the voltages $V_A$, $V_B$ and $V_R$, $Q_{max}$ can be changed easily. If the voltage $V_B$ is set to a lower one of the source-gate breakdown voltage ($V_{s\text{-}Gmax}$) of the switch transistor 124 and the source-drain breakdown voltage ($V_{s\text{-}Dmax}$), the switch transistor 124 can be protected from the breakdown voltage.

Figure 23:
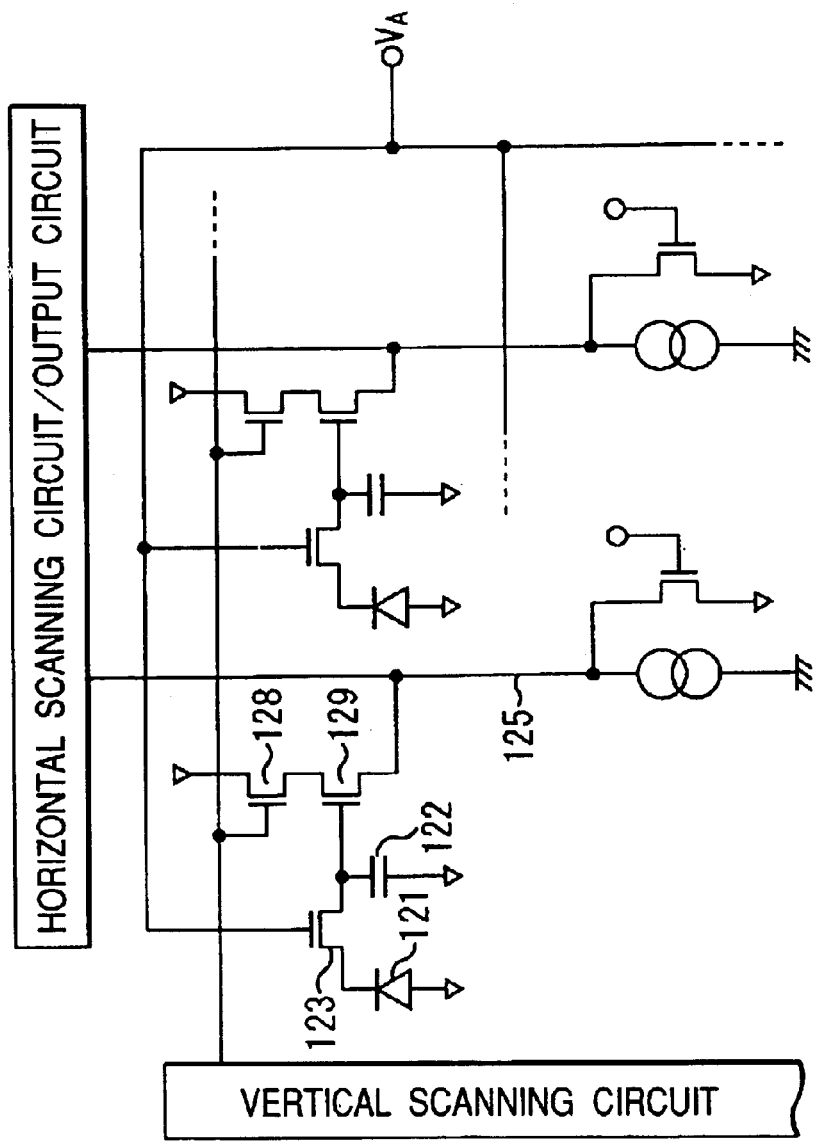
FIG. 23 is a simplified equivalent circuit diagram of a fourth modification of the radiation imaging system of the embodiment.

In the X-ray imaging system of the fourth modification shown in FIG. 23, each cell is provided with a source follower, i.e., amplifier so that signal amplification and sensitivity improvement are possible. Each cell is provided with a select transistor 128 and an amplifier transistor 129 to constitute the source follower.

Figure 24:
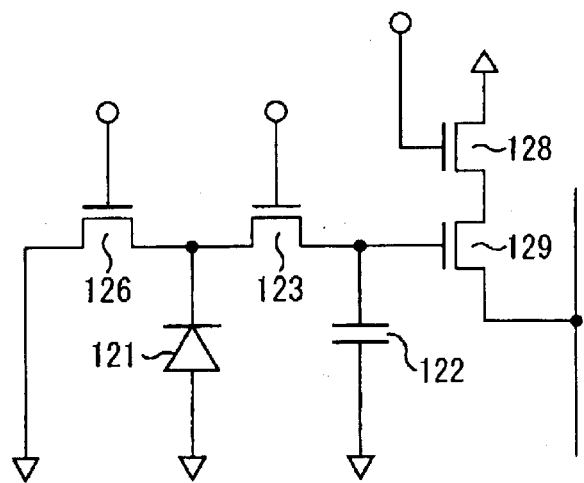
FIG. 24 is an equivalent circuit diagram showing an example of a unit cell with a source follower of the first modification of the radiation imaging system of the embodiment.
Figure 25:
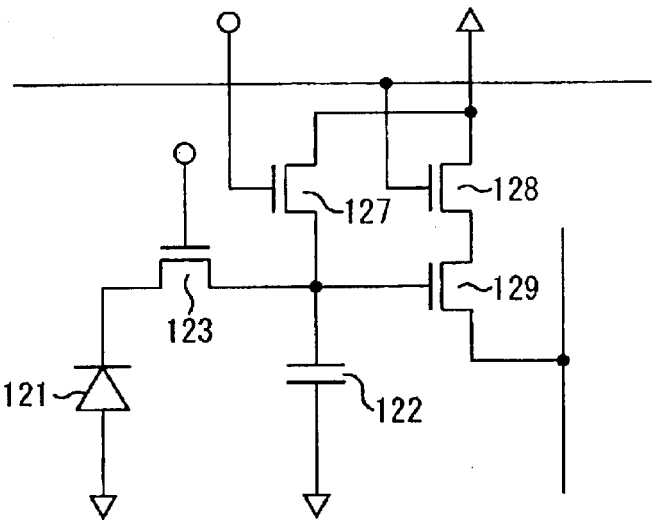
FIG. 25 is an equivalent circuit diagram showing an example of a unit cell with a source follower of the second modification of the radiation imaging system of the embodiment.
Figure 26:
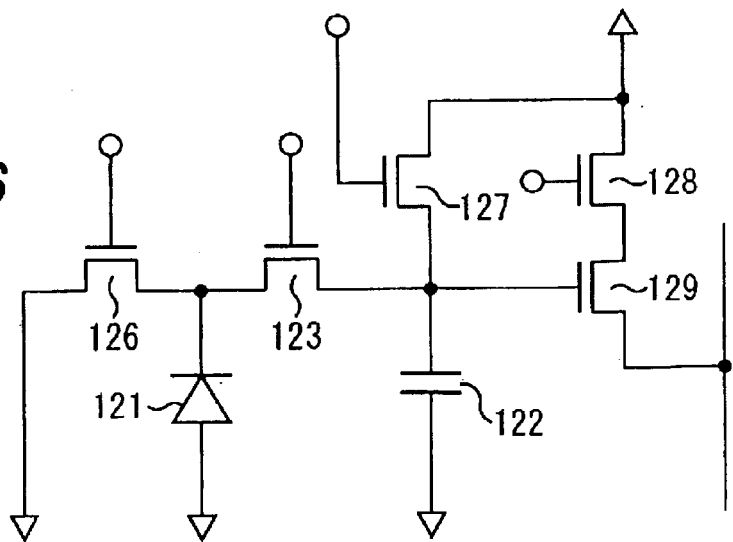
FIG. 26 is an equivalent circuit diagram showing an example of a unit cell with a source follower of the third modification of the radiation imaging system of the embodiment.

In the unit cells shown in FIGS. 24 to 26, the source follower of the fourth modification of the X-ray imaging system shown in FIG. 23 is added to each unit cell of the first modification of the X-ray imaging system shown in FIG. 20, the second modification of the X-ray imaging system shown in FIG. 21 and the third modification of the X-ray imaging system shown in FIG. 22, respectively. In the unit cells shown in FIGS. 24 and 26, the reset transistor 126 is provided to mitigate an after image.

(Fifth Modification of X-ray Imaging System)

Figure 27:
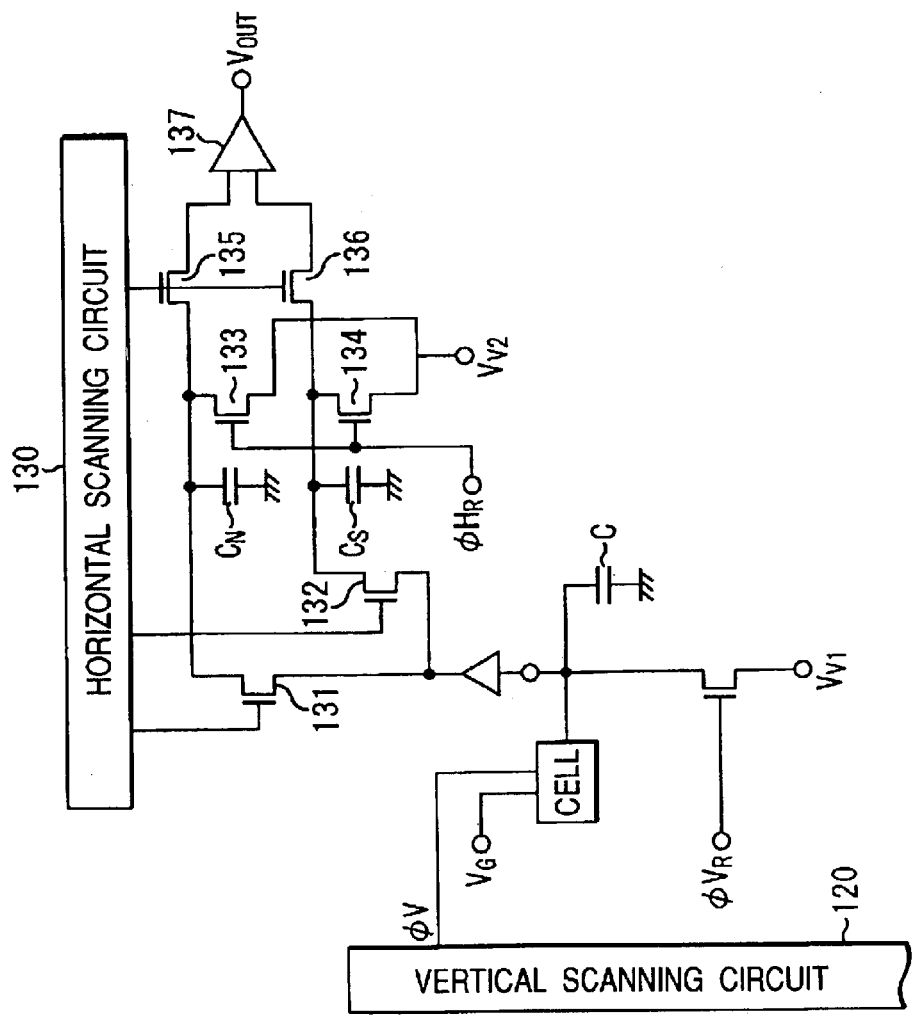
FIG. 27 is a schematic equivalent circuit diagram of a fifth modification of the radiation imaging system of the embodiment.

Next, the fifth modification of the X-ray imaging system of the embodiment will be described. FIG. 27 is a simplified equivalent circuit diagram of the fifth modification of the X-ray imaging system having two output series in order to eliminate fixed pattern noises.

Referring to FIG. 27, φVR is applied to reset the cell and capacitor C to accumulate noises N in an accumulation capacitor $C_N$ via a transistor 131.

After a signal S is accumulated in the cell, a signal (S+N) including the noise components is read via a transistor 132 and accumulated in an accumulation capacitor $C_S$.

Thereafter, transistors 135 and 136 are turned on to read the noises and the signal including the noises from the accumulation capacitors $C_N$ and $C_S$. A substraction amplifier 137 subtracts the noise components N from the signal (S+N) including the noise components and outputs a signal S ($V_{out}$).

Reference numerals 133 and 134 represent reset transistors for resetting the accumulation capacitors $C_N$ and $C_S$. Before the cell is reset, the transistors 135 and 136 are turned on by φHR to reset the accumulation capacitors $C_N$ and $C_S$.

(Sixth Modification of X-ray Imaging System)

Next, the sixth modification of the X-ray imaging system of the embodiment will be described.

Figure 33:
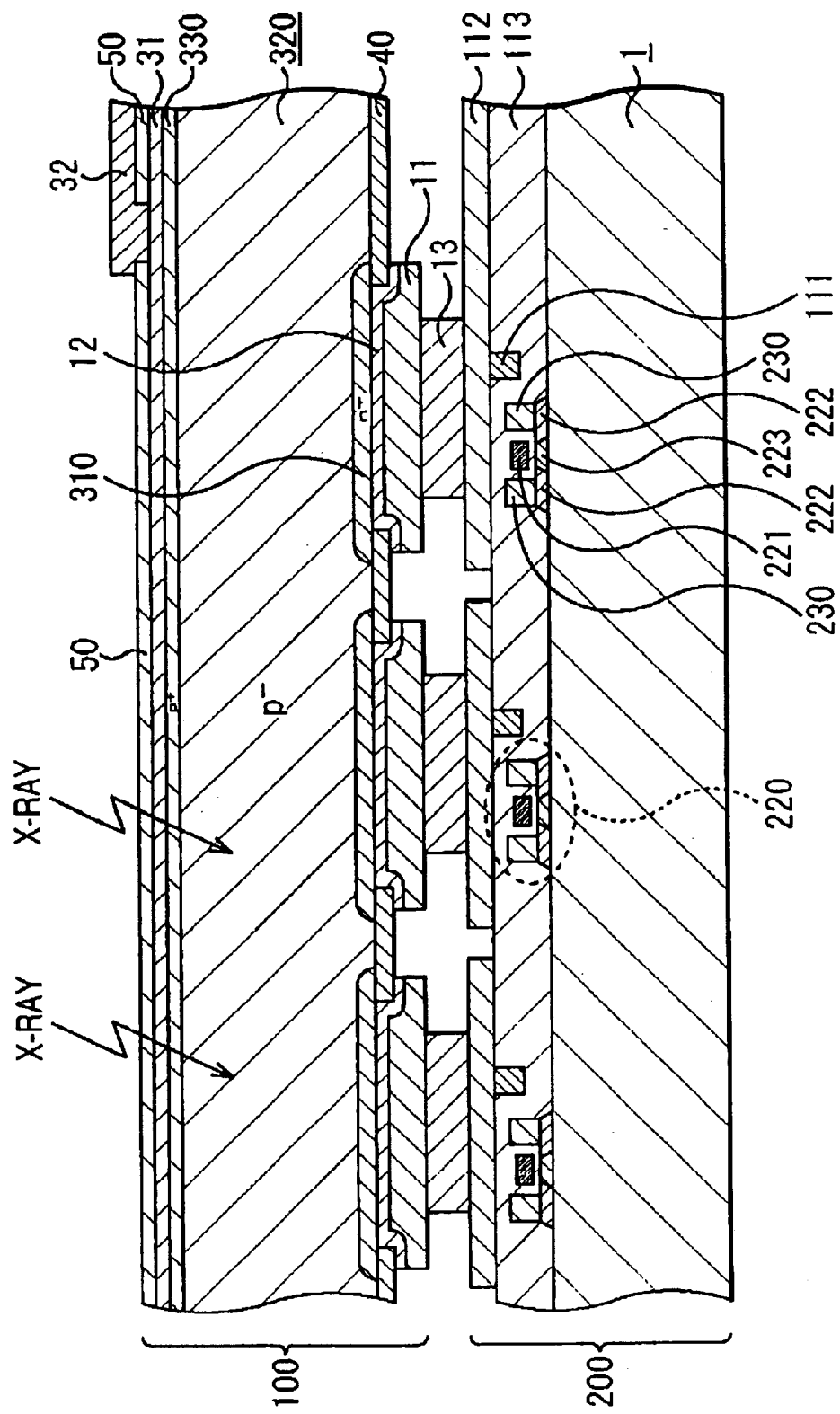
FIG. 33 is a simplified cross sectional view of an X-ray sensor of a sixth modification of the radiation imaging system of the embodiment.

FIG. 33 is a simplified cross sectional view of an X-ray sensor of the sixth modification of the embodiment. In FIG. 33, elements having the identical reference numerals are the same as those described with reference to FIG. 11 and the detailed description thereof is omitted.

As described with reference to FIG. 11, in the X-ray sensor shown in FIG. 33, as X-rays are irradiated to the sensing unit 100, electron-hole pairs are generated and ones of the carriers are accumulated and an electrical signal containing image information is read.

An X-ray sensing unit 100 is made of semiconductor such as GaAs, GaP and Si and has an n-layer 310, an i-layer 320 and a p-layer 330. These layers 310, 320 and 330 constitute a pin diode in which a depletion layer extends from the interface between the n-layer 310 and p-layer 320.

Metal layers 31 and 32 are formed above the p-layer 330, i.e., on the X-ray incidence side, and metal layers 11 and 12 are formed under the n-layer 310, i.e., on the opposite side to the X-ray incidence side.

The metal layer 12 is a barrier metal layer. As described earlier, the X-ray sensing unit 100 is made of a single crystal semiconductor substrate.

As shown, the X-ray sensor is different from those shown in FIGS. 11 and 12 in that a connection direction of a diode of the X-ray sensing unit 100 is different.

A reading unit 200 has n-type thin film transistors 220 constituting a circuit and formed on the insulating substrate 1. The n-type thin film transistor 220 has a gate 221, a pair of n-type source and drain regions 222, a semiconductor active layer 223 having a low impurity concentration and metal wires 230 connected to the source and drain regions 222.

The thin film transistor 220 is covered with a protective film 113. As the semiconductor material of the thin film transistor 220, material which is not a single crystal is suitable, such as amorphous silicon, polysilicon, and micro crystal silicon.

Similar to FIG. 11, although not shown in FIG. 33, accumulation capacitors are formed in the reading unit 200.

Figure 34:
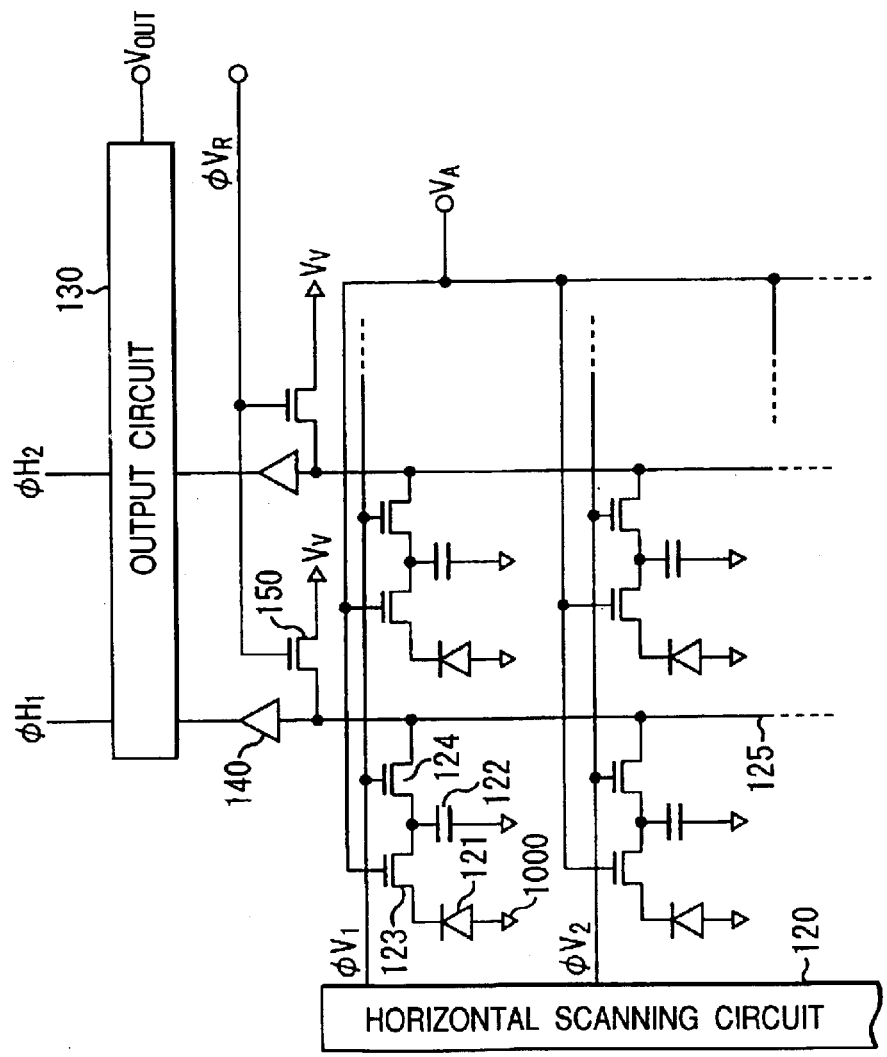
FIG. 34 is a simplified equivalent circuit diagram of the sixth modification of the radiation imaging system of the embodiment.

FIG. 34 is a simplified equivalent circuit diagram of the X-ray imaging system having the X-ray sensor shown in FIG. 33. In FIG. 34, elements having the identical reference numerals to those shown in FIG. 12 are similar elements and the detailed description thereof is omitted.

Referring to FIG. 34, a unit cell has: an X-ray sensor cell 121; an accumulation capacitor 122; a first n-type thin film transistor (TFT) 123 for transferring a signal in the X-ray sensor cell 121 to the accumulation capacitor 122; and a second n-type thin film transistor (TFT) 124 for reading a signal from the accumulation capacitor 122.

In the equivalent circuit diagram shown in FIG. 34, the polarity of the X-ray sensor cell 121 drawn as a diode is different from the equivalent circuit diagram shown in FIG. 12.

A horizontal scanning circuit (shift registers or the like) 120 selects the second n-type transistors 124 of unit cells of each row. A signal is read from the accumulation capacitor 122 of each unit cell to an output line 125. This signal is input to an output circuit 130 via an amplifier 140 connected to the output line 125. The output circuit 130 sequentially outputs signals of respective rows.

Connecting the amplifier 140 to each output line is effective for obtaining a sufficient S/N ratio. The reason for this is as follows. In a radiation imaging system having a large circuit board such as a size of 20 cm×20 cm or 43 cm×43 cm formed on a glass substrate, as compared to the capacitance value (usually about 0.5 to 3 pF) of the accumulation capacitor of the radiation imaging system, the value of parasitic capacitance such as capacitance at the output line cross areas and capacitance between the gate of a thin film transistor and the source connected to the output line is as large as about several tens to 100 pF.

Each accumulation capacitor 122 and each output line 125 are set to a potential $V_V$ by an output line reset transistor 150 via the transistor 124.

Figure 43:
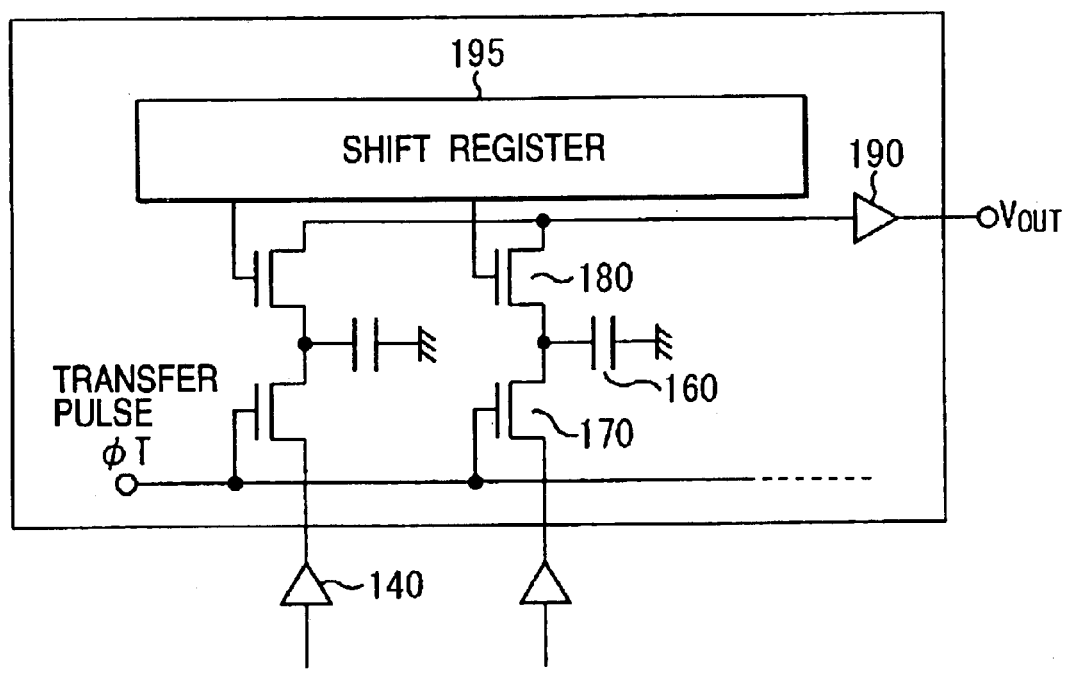
FIG. 43 is a simplified circuit diagram showing a modification of an output circuit of the embodiment.

For example, the output circuit 130 has an accumulation capacitor 160 provided for each output line and a transistor 170 for connecting the accumulation capacitor and a common output line (refer to the simplified circuit diagram shown in FIG. 43).

In the output circuit 130, by applying a transfer pulse $\phi T$, the electric signals from the output lines are sequentially accumulated in the sampling accumulation capacitors, and timing pulses $\phi H1$, $\phi H2$ . . . are sequentially input from a scanning circuit 195 such as shift resisters to the output circuit 130 to sequentially turn on transistors 180 so that signals $V_{OUT}$ from the sampling accumulation capacitors 160 of respective columns are read to and output from a buffer amplifier 190 connected the common output line.

Figure 35:
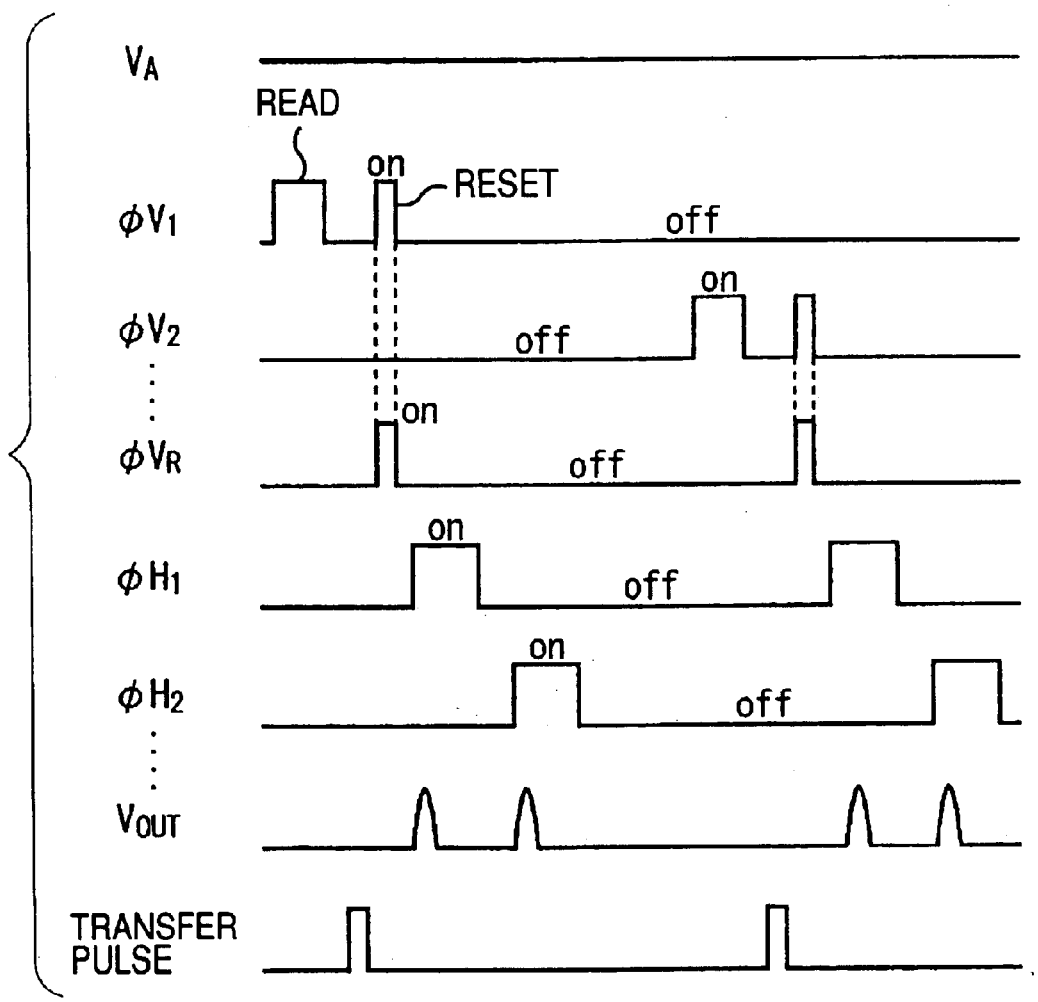
FIG. 35 is a timing chart illustrating an example of the operation of the sixth modification of the radiation imaging system of the embodiment.

FIG. 35 shows an example of the timing chart explaining the operation of driving the X-ray imaging system shown in FIG. 34.

It is assumed that voltage applied to the gate of the transistor 123 is a constant voltage (voltage $V_A$). In order to reset the accumulation capacitor 122 and output line 125, $\phi VR$ is set to $V_R$ to turn on the output reset transistor 150 applied with a reset potential $V_V$ and at the same time turn on $\phi V1$ (reset mode)

Thereafter, $\phi VR$ and $\phi V1$ are turned off so that the X-ray sensor cell 121 enters an accumulation mode. Next, the horizontal scanning circuit 120 applies a pulse $\phi V1$ to read a signal stored in the accumulation capacitor 122 to each output line 125 (read mode).

After charges are transferred to the sampling accumulation capacitors at the same time by using a transfer pulse, horizontal scanning is performed by $\phi H1$, $\phi H2$ . . . to sequentially output a signal ($V_{out}$) from the sampling accumulation capacitors. After accumulated charges are transferred to the output lines 125, the reset mode resumes again.

The above-described operation cycles are performed for each horizontal line to sequentially read information. Only the output line 125 may be reset again by turning on the transistor 150 as a reset means (turn-on of $\phi VR$) in the state (turn-off state of $\phi Vi$ (i=1, 2, 3 . . . )) that the transistor 124 as a read means is turned off immediately before the read mode $\phi Vi$ (i=1, 2, 3 . . . ) is turned on.

In this case, the other operations are similar to those explained in FIG. 35. With this setting, it is possible to prevent the phenomenon (called blooming in CCD or the like) that when strong radioactive rays enter in a partial imaging area, charges are leaked from the accumulation capacitor to the output line via the switch 124 and reading the other cells is influenced.

In the X-ray sensor shown in FIG. 33, the p-layer 330 and n-layer 310 are not sensitive to radioactive rays, and X-rays are effectively converted into carriers in the depletion layer.

While the constant voltage $V_A$ is applied to the thin film transistor 123, one electrode of the sensor cell 121 is always applied with a voltage of $(V_A-V_T)$ Therefore, a constant voltage is always applied to the sensor cell 121 and the thickness of the depletion layer does not change.

(Fourth Modification of X-ray Sensor)

Figure 36:
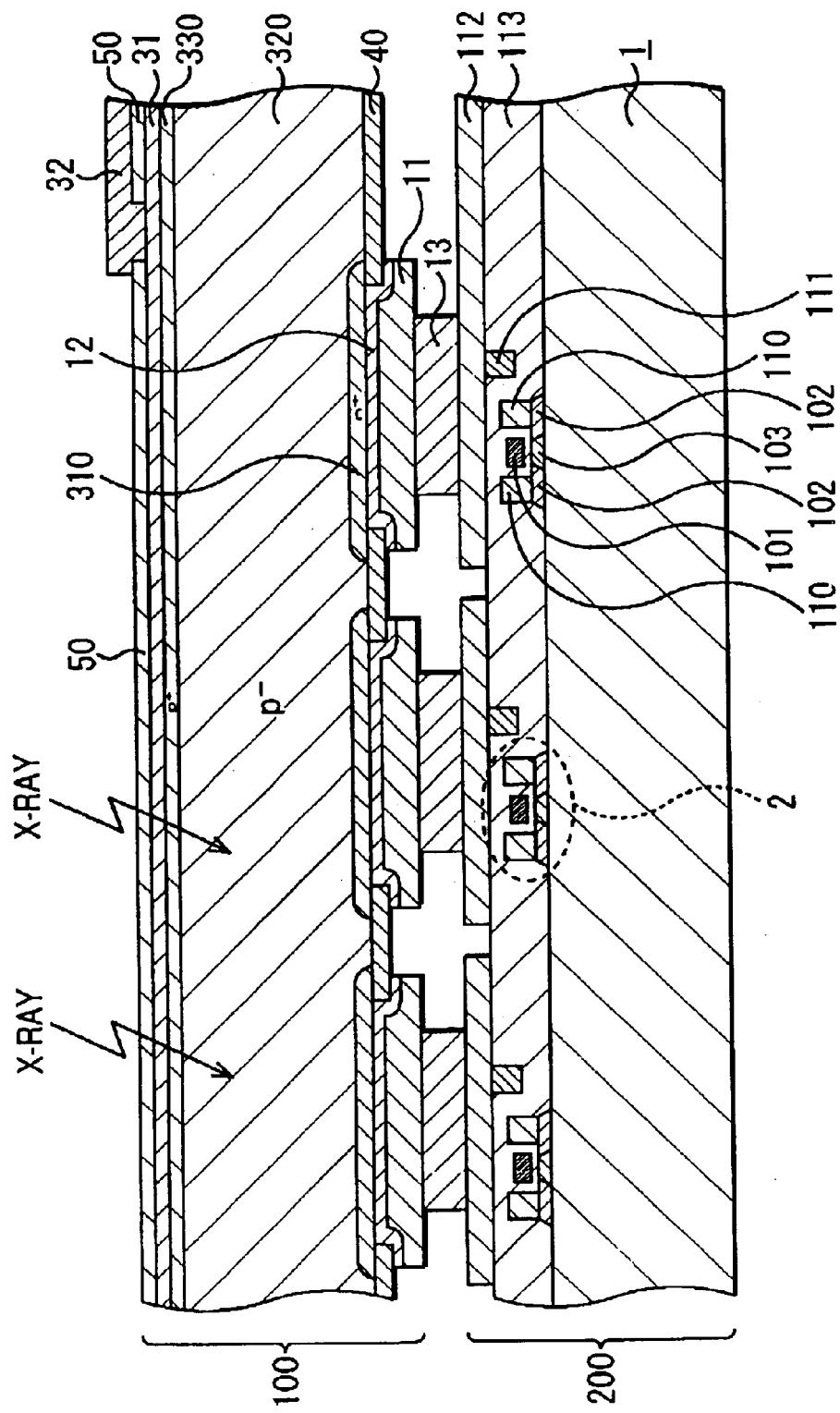
FIG. 36 is a simplified cross sectional view of a fourth modification of the X-ray sensor of the embodiment.

FIG. 36 is a simplified cross sectional view of the fourth modification of the X-ray sensor. The X-ray sensor shown in FIG. 36 is different from the X-ray sensor shown in FIG. 32 in that the polarity of the X-ray sensing unit 100 is different and i-type single crystal semiconductor is used as the material of a high resistance X-ray detecting unit.

GaAs is particularly excellent as the material of the single crystal high resistance unit (p$^-$-region) 320 because GaAs has a high resistivity (>$10^7$ Ω·cm), a small dark current (band gap 1.5 eV or smaller) and a large diameter wafer (6 inches $\phi$). Reference numeral 310 represents an n$^+$-layer and reference numeral 330 represents a p$^+$-region.

(Fifth Modification of X-ray Sensor)

Figure 37:
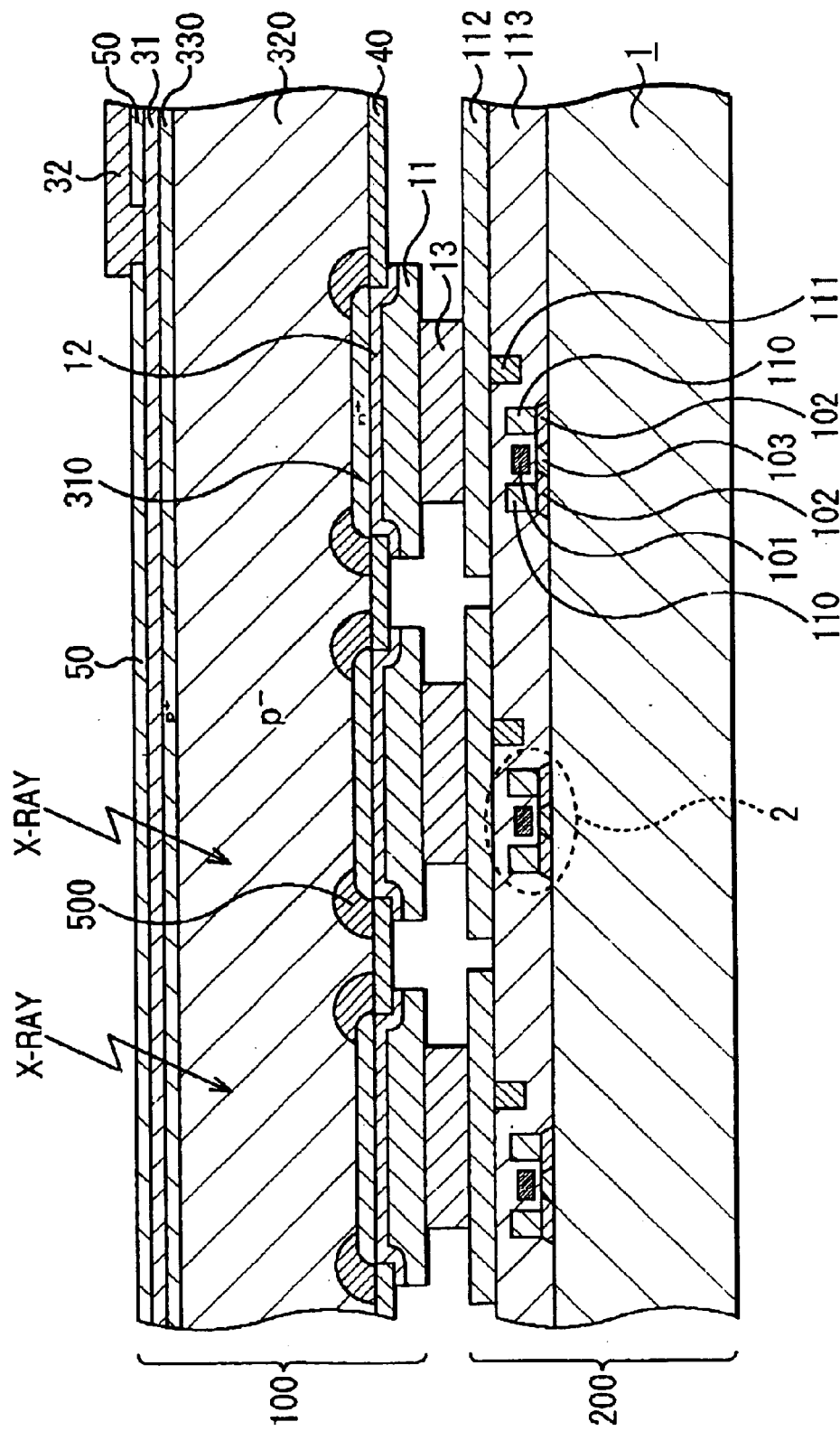
FIG. 37 is a simplified cross sectional view of a fifth modification of the X-ray sensor of the embodiment.

FIG. 37 is a simplified cross sectional view of the fifth modification of the X-ray sensor. The X-ray sensor shown in FIG. 37 is different from the X-ray sensor shown in FIG. 32 in that the polarity of the X-ray sensing unit 100 is different and p$^-$- or i-type single crystal semiconductor (in FIG. 37 p$^-$-region) is used as the material of a high resistance X-ray detecting unit.

An n-region (guard region) 500 having a concentration lower than n$^+$ is formed around the n$^+$-layer 310. A peripheral sharp electric field to be generated when a high voltage is applied to the X-ray sensor can be relaxed and the breakdown voltage of the pn junction can be raised.

(Sixth Modification of X-ray Sensor)

Figure 38:
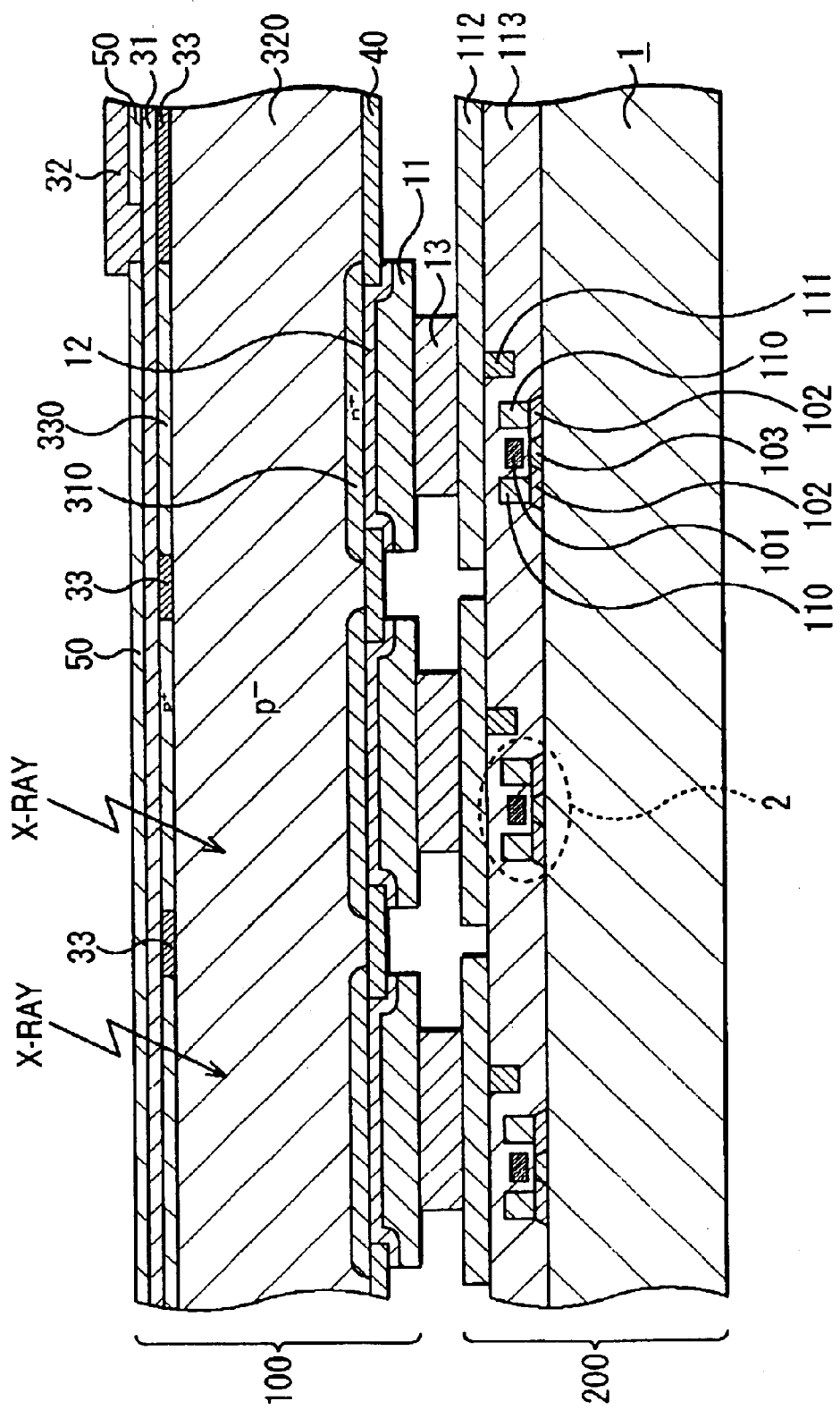
FIG. 38 is a simplified cross sectional view of a sixth modification of the X-ray sensor of the embodiment.

FIG. 38 is a simplified cross sectional view of the sixth modification of the X-ray sensor. The X-ray sensor shown in FIG. 38 is different from the X-ray sensor shown in FIG. 32 in that the polarity of the X-ray sensing unit 100 is different and i-type single crystal semiconductor (in FIG. 38 p$^-$-region 320) is used as the material of a high resistance X-ray detecting unit.

In this X-ray sensor, the upper p$^+$-region 330 is separated so that the resolution can be improved. Reference numeral 33 represents an insulating film for separating the p$^+$-region 330.

In the X-ray sensor shown in FIG. 38, if the p⁻-region 320 is changed to the opposite conductivity type n, the depletion layer extends from the surface side. Since the depletion layer exists in the area where the amount of incident X-rays is large by all means, the sensitivity and resolution can be stabilized. It is necessary that the depletion layer exists between p and n and extends the whole thickness of the n-region.

(Seventh Modification of X-ray Sensor)

Figure 39:
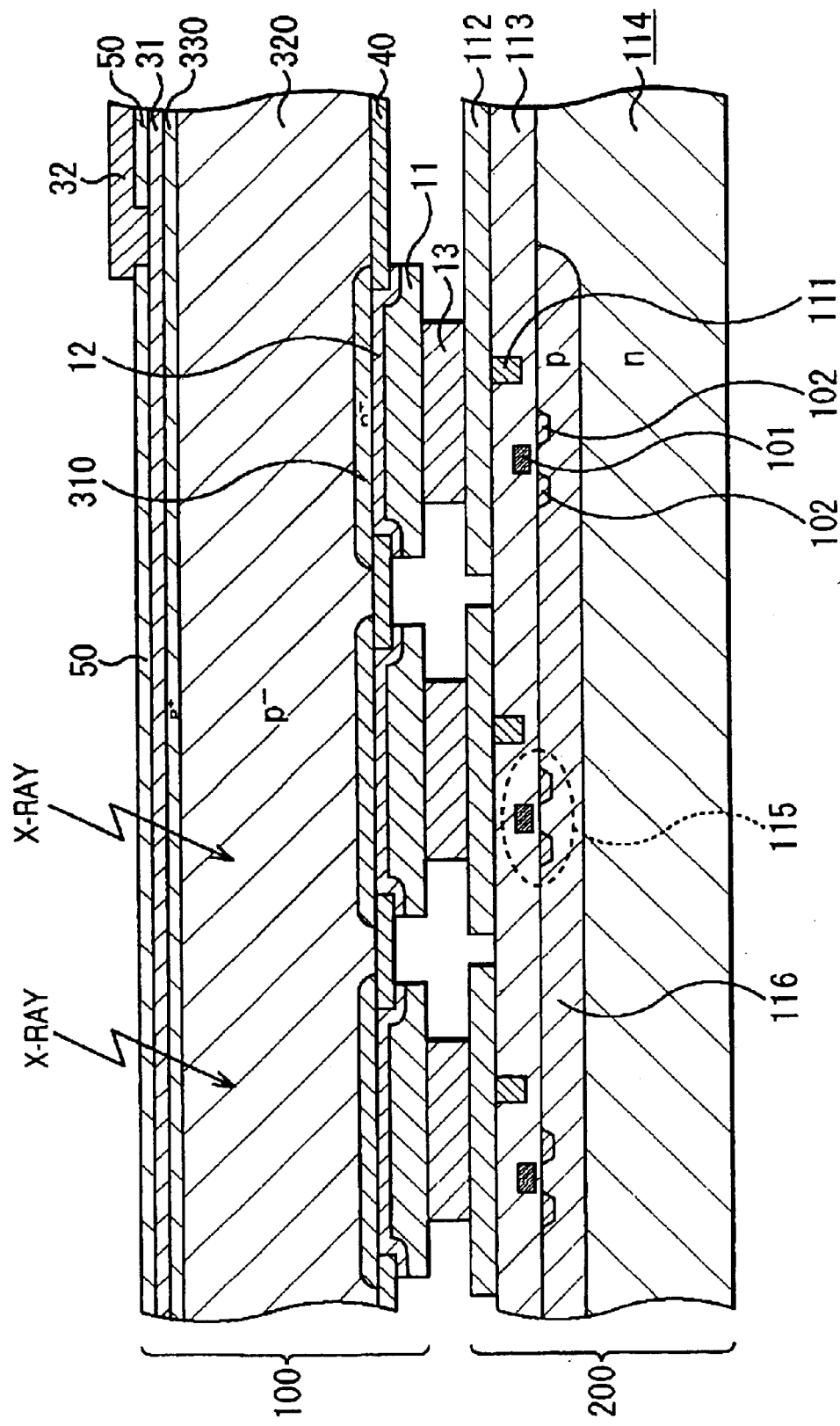
FIG. 39 is a simplified cross sectional view of a seventh modification of the X-ray sensor of the embodiment.

FIG. 39 is a simplified cross sectional view of the seventh modification of the X-ray sensor. The X-ray sensor shown in FIG. 39 is different from the X-ray sensor shown in FIG. 32 in that the lower substrate is made of a single crystal substrate and the polarity of the X-ray sensing unit 100 is different.

In the X-ray sensor of the seventh modification, a single crystal substrate 114 is used so that the peripheral circuit can be implemented on the lower substrate and a sophisticated function and a high speed read can be more effectively realized. A transistor 115 is formed by forming a gate electrode above a p-region 116.

(Eighth Modification of X-ray Sensor)

Figure 40:
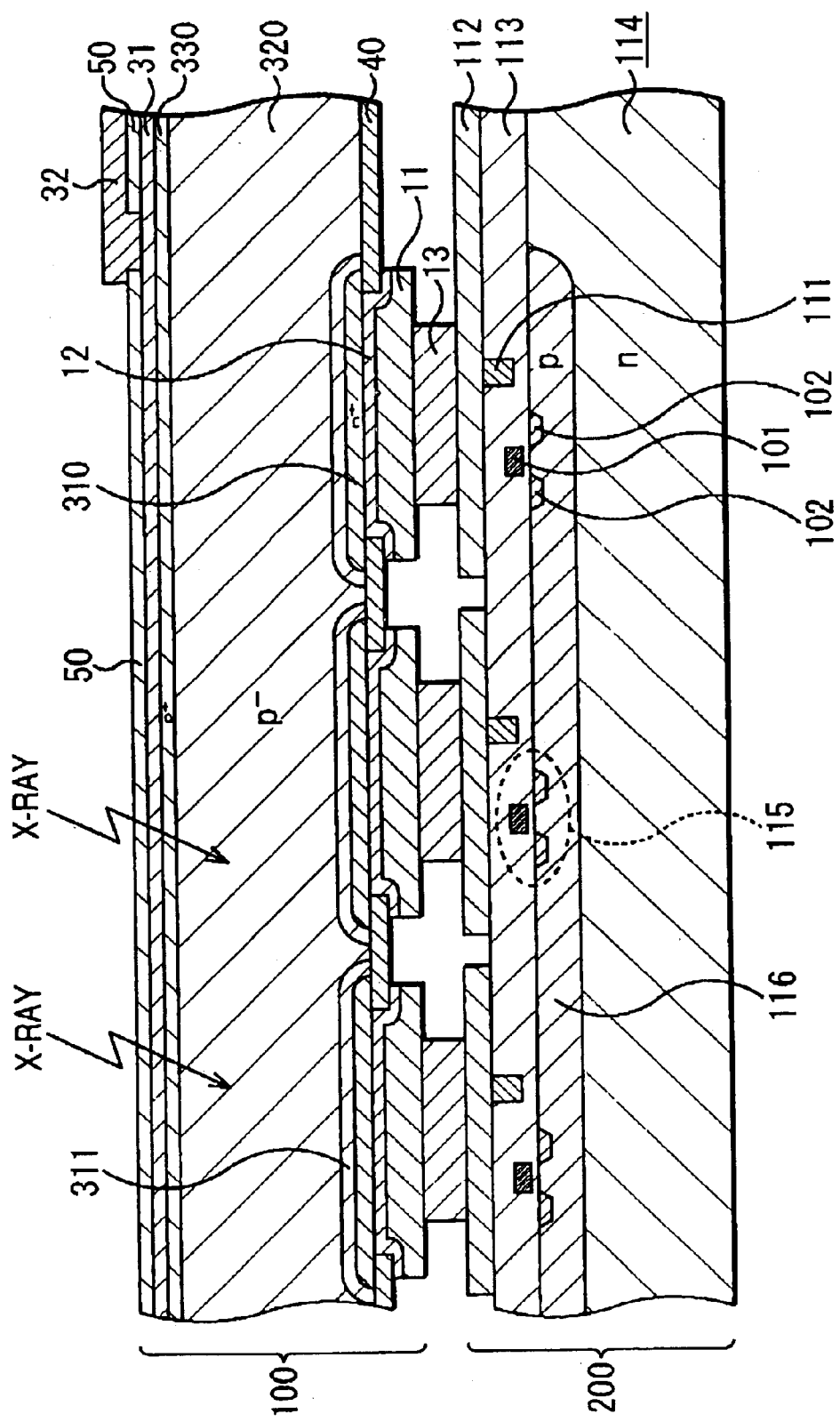
FIG. 40 is a simplified cross sectional view of an eighth modification of the X-ray sensor of the embodiment.

FIG. 40 is a simplified cross sectional view of the eighth modification of the X-ray sensor. The X-ray sensor shown in FIG. 40 has the structure that an n-type region 311 having an impurity concentration lower than the n⁺-region 310 of X-ray sensor shown in FIG. 39 is formed around the n⁺-region 310.

With this structure, an electric field near the n⁺-region 310 of the pn junction lowers so that the breakdown voltage can be raised and the dark current in the depletion layer can be reduced.

(Seventh Modification of X-ray Imaging System)

Figure 41:
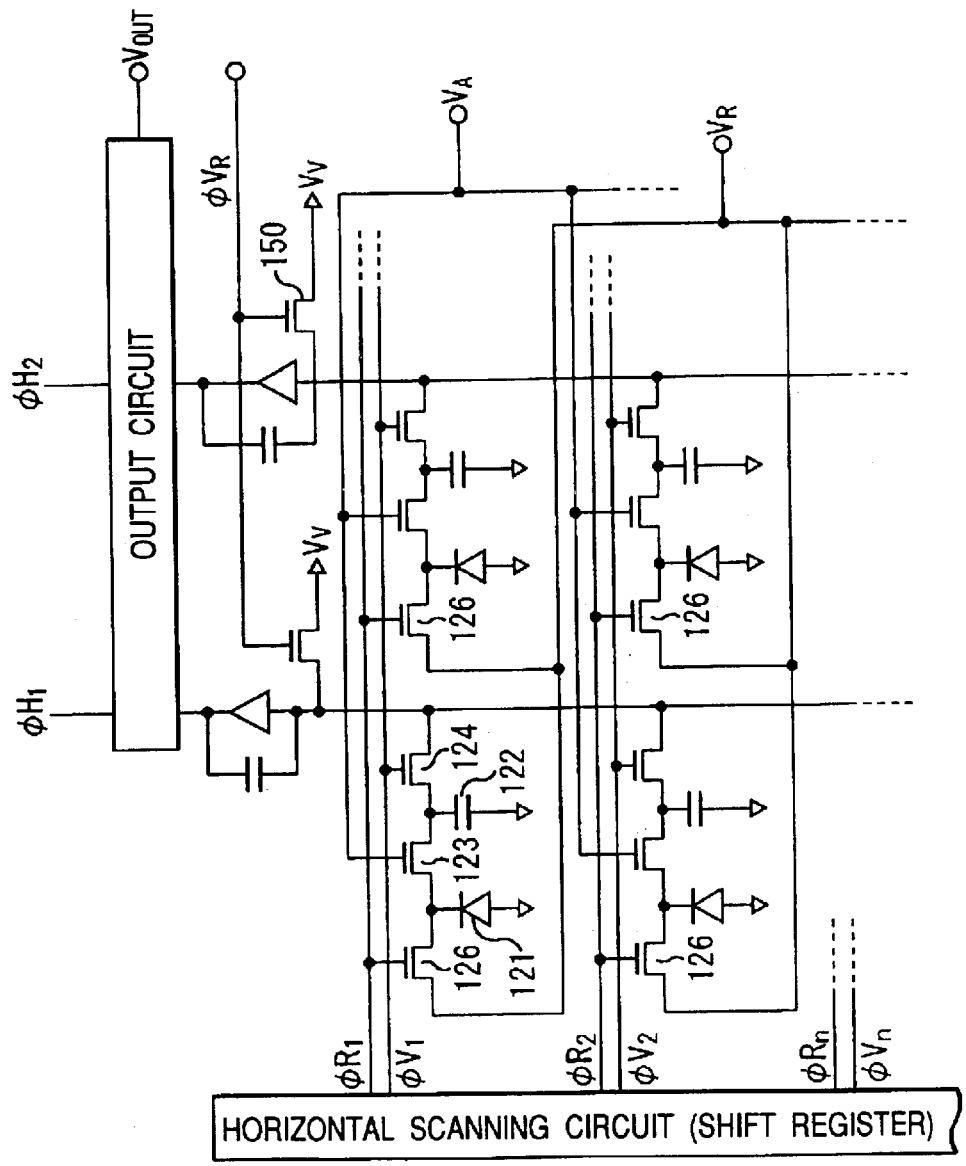
FIG. 41 is a simplified equivalent circuit diagram of a seventh modification of the radiation imaging system of the embodiment.

FIG. 41 is a simplified equivalent circuit diagram of the seventh modification of the X-ray imaging system of the embodiment. In the X-ray imaging system of the seventh modification, the polarity of the sensor cell 121 in the simplified equivalent circuit diagram shown in FIG. 20 is reversed.

Figure 42:
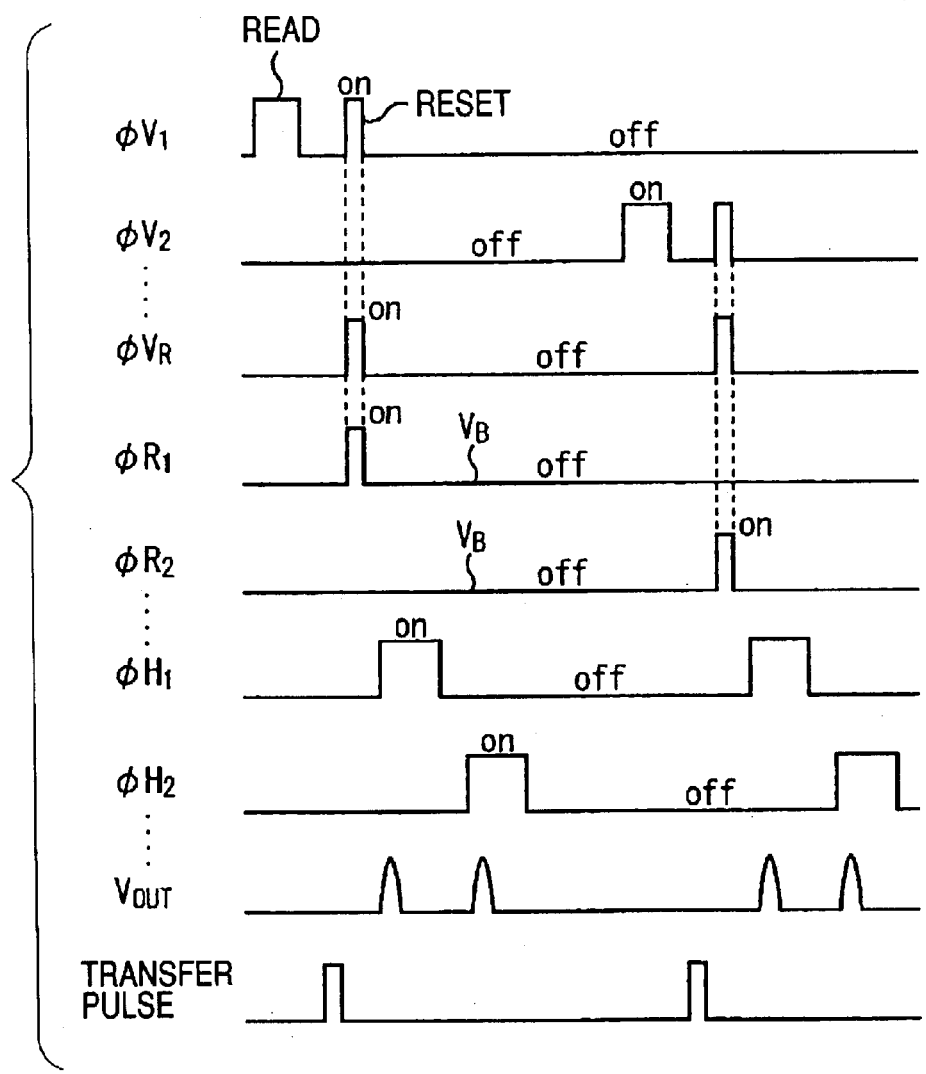
FIG. 42 is a timing chart illustrating an example of the operation of the seventh modification of the radiation imaging system of the embodiment.

FIG. 42 is a timing chart explaining the operation of driving the X-ray imaging system of the seventh modification.

The sensor cell (sensor unit) 121 is reset by applying $\phi R1$, $\phi R2$ ... and $\phi V1$, $\phi V2$ ... synchronizing with $\phi VR$ and driving transistors 124, 126 and 130.

During turn-off of $\phi R1$ and $\phi R2$, the reset transistor 126 is not completely turned off, but a voltage $V_B$ is applied to the gate of the transistor 126. In this case, even if X-rays are input to the sensor unit and a large charge QLarge is accumulated in the accumulation capacitor 122 (capacitance C1), VLarge (=QLarge/C1) will not become higher than $(V_B-V_{TH})$.

It is therefore possible not to apply an excessive voltage to the transistor 124. For example, the excessive voltage is a voltage higher than the signal accumulation maximum voltage $V_{max}$ applied to the thin film transistor 124 shown in FIG. 13C.

If a voltage equal to or higher than the signal accumulation maximum voltage $V_{max}$ is applied across the accumulation capacitor 122, carriers flow toward the output side of the transistor 124 and the image is influenced greatly. The influence upon the image called blooming in CCD or the like can be eliminated by driving the transistor 126 in the above manner.

This modification is also applied to the X-ray sensing systems shown in FIGS. 23 to 27 by changing the polarity of the X-ray sensing units.

(First Modification of Output Circuit)

FIG. 43 shows the first modification of the output circuit. Referring to FIG. 43, outputs from respective lines are transferred at the same time via amplifiers 140 to capacitors 160 by applying a transfer pulse $\phi T$ to transistors 170. Thereafter, pulses are applied from a shift register 195 to transistors 180 to output a voltage $V_{out}$ from an amplifier 190. The transfer pulse shown in FIGS. 35 and 42 corresponds to the transfer pulse $\phi T$.

Figure 28:
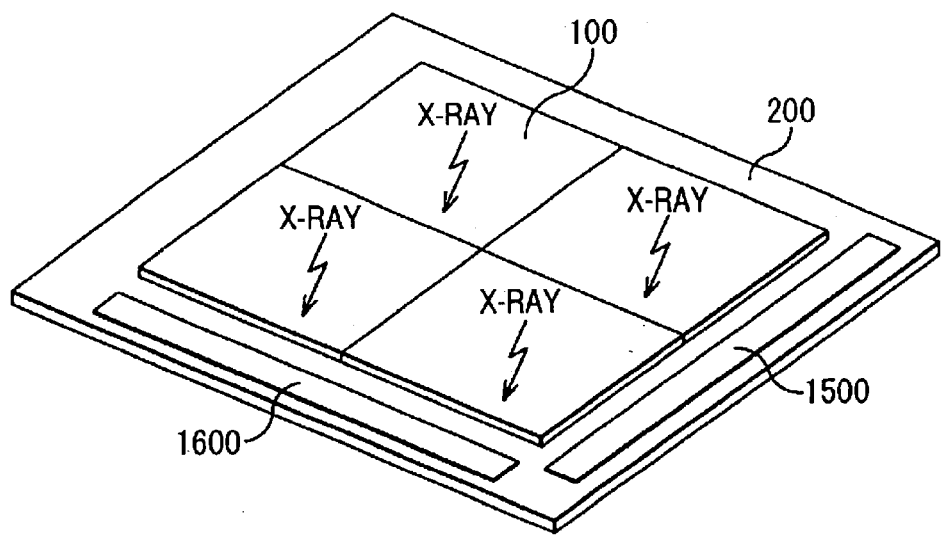
FIG. 28 is a schematic perspective view showing an example of the structure of a radiation imaging system according to an embodiment of the invention.

FIG. 28 is a schematic perspective view showing an example of a large screen radiation imaging system having a plurality of X-ray sensing units 100 formed on a substrate 200 having a read circuit and the like and formed on an insulating substrate.

In FIG. 28, reference numerals 1500 and 1600 represent a driver circuit and an output circuit, respectively, which are formed on a reading unit as a circuit substrate unit. As a substrate of the reading unit 200, a glass substrate is used so that the radiation imaging system can have a large screen.

Figure 29:
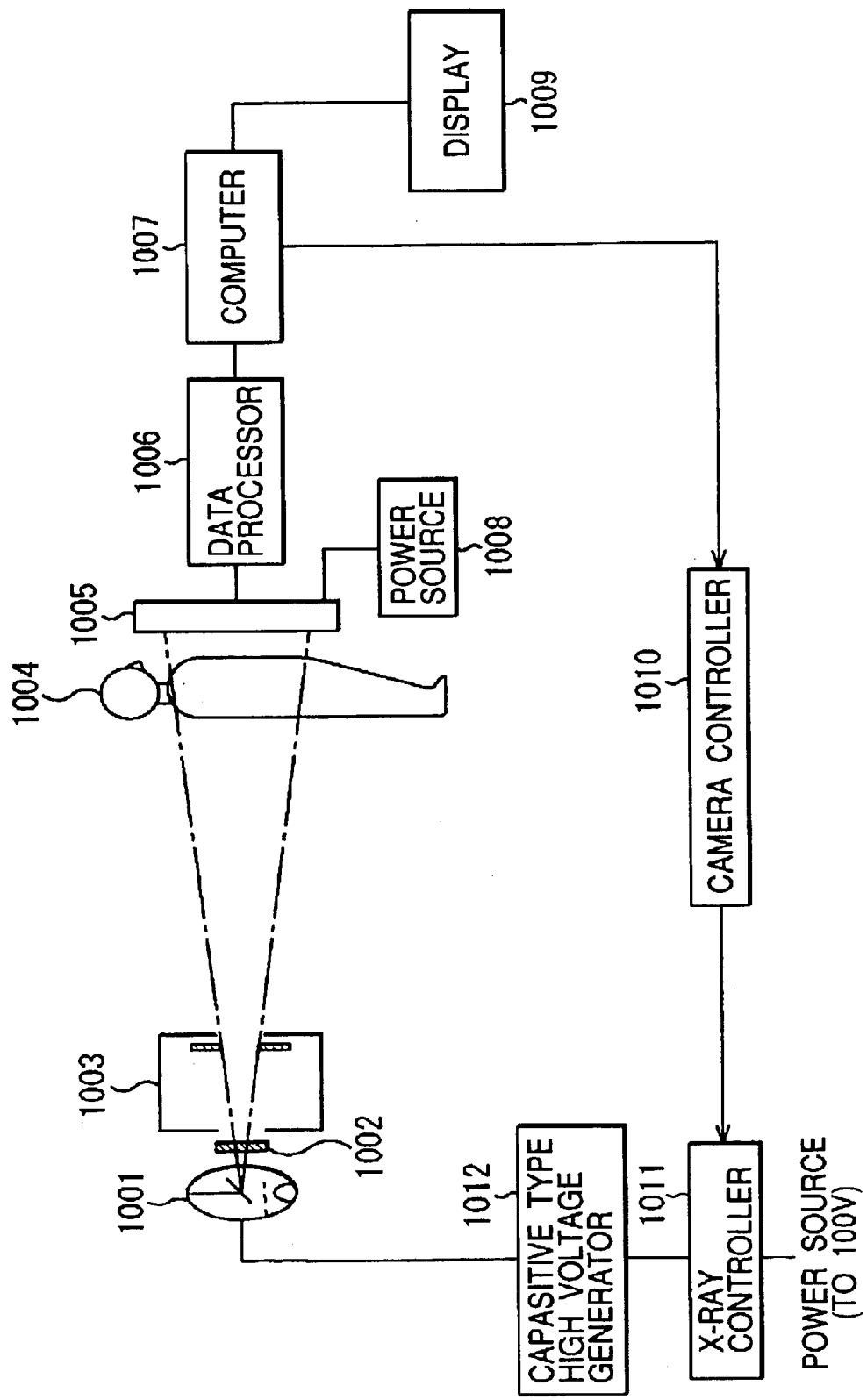
FIG. 29 is a schematic diagram showing an example of the structure of a nondestructive inspecting system, typically, a medical diagnostic instrument, using a radiation imaging system according to an embodiment of the invention.

FIG. 29 is a schematic diagram showing an example of a medical diagnosing instrument using a radiation imaging system.

In FIG. 29, reference numeral 1001 represents an X-ray tube as an X-ray source, reference numeral 1002 represents an X-ray shutter for opening and closing X-rays, reference numeral 1003 represents an irradiation tube or variable aperture, reference numeral 1004 represents an object, reference numeral 1005 represents a radiation sensor using the embodiment radiation imaging system, and reference numeral 1006 represents a data processor for processing a signal from the radiation sensor 1005.

Reference numeral 1007 represents a computer. In accordance with a signal from the data processor 1006, the computer displays an X-ray image or the like on a display 1009 such as a CRT or controls the X-ray tube via a camera controller 1010, an X-ray controller 1011 and a capacitive type high voltage generator 1012 to control the amount of X-rays to be generated.

(Other Embodiments)

The scope of the invention contains also the case wherein software program codes realizing the function of each embodiment described above are supplied to a computer (CPU or MPU) of an apparatus or system connected to various devices realizing the embodiment function, and the computer operates the devices in accordance with the stored programs.

In this case, the software program codes themselves realize the embodiment function. Therefore, the program codes themselves and means for supplying the program codes, e.g., a storage medium storing the program codes, constitute the present invention. The storage medium for storing such program codes may be a flexible disk, a hard disk, an optical disk, a magneto optical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

What is claimed is:

1. A radiation detector including a radiation detecting element having: a charge emitting layer for converting an incident radioactive ray into an electric charge and emitting the converted charge; a semiconductor layer of a first conductivity type; and a semiconductor layer of a second conductivity type opposite to the first conductivity type, wherein at least the charge emitting layer is sandwiched between the first conductivity type semiconductor layer and second conductivity type semiconductor layer, the radiation detector comprising:

bias applying means for applying an electric field to the charge emitting layer, the electric field having an intensity satisfying a lower limit of a specification value of a carrier capturing efficiency and an upper limit of a specification value of a dark current density.

2. A radiation detector according to claim 1, wherein the electric field E to be applied to the charge emitting layer satisfies a following simultaneous inequalities (1) and (2):

$$E \leq \frac{J_0}{e}\left[\mu_e\left(C_e p_T + \frac{1}{\tau_{ec}}\right)^{-1}\left(e_e n_T + \frac{n_{p0}}{\tau_{ec}}\right) + \mu_h\left(C_h n_T + \frac{1}{\tau_{hc}}\right)^{-1}\left(e_h p_T + \frac{p_{n0}}{\tau_{hc}}\right)\right]^{-1} \quad (1)$$

$$\frac{\alpha_s \exp(-\alpha_T W)}{\alpha_s - \alpha_T W} \cdot \frac{1 - \exp[-(\alpha_s - \alpha_T)W]}{1 - \exp(-\alpha_s W)} \geq \eta_0 \quad (2)$$

where $J_0$ is a specification value of a dark current density, e is an elementary electric charge, $\mu_e$ is a mobility of an electron emitted at a trap level of the charge emitting layer, $C_e$ is a trap coefficient of an electron at the trap level of the charge emitting layer, $e_e$ is an emission coefficient of an electron at a trap level of the charge emitting layer, $\mu_h$ is a mobility of a hole emitted at a trap level of the charge emitting layer, $C_h$ is a trap coefficient of a hole at the trap level of the charge emitting layer, $e_h$ is an emission coefficient of a hole at the trap level of the charge emitting layer, $\tau_{ec}$ is an average collision time of an electron emitted at the trap level of the charge emitting layer, $\tau_{hc}$ is an average collision time of a hole emitted at the trap level of the charge emitting layer, $n_T$ and $p_T$ are concentrations of electrons and holes occupying trap levels of the charge emitting layer, $n_{p0}$ and $p_{n0}$ are a concentration of electrons in an equilibrium state in a p-type semiconductor layer and a concentration of holes in an equilibrium state in an n-type semiconductor layer, $\alpha_s$ is an attenuation coefficient indicating a distribution of concentrations of generated carriers, $\alpha_T$ ($=C_{epT}/\mu_e E$ or $C_{hnT}/\mu_h E$) is an attenuation coefficient of carriers at the trap level, W is a width of a depletion layer formed in the charge emitting layer, and $\eta_0$ is a specification value of a carrier capturing efficiency.

3. A radiation detector according to claim 1, wherein the charge emitting layer includes a single crystal semiconductor substrate.

4. A radiation detector according to claim 3, wherein the single crystal semiconductor substrate has a band gap energy of 1 eV or higher.

5. A radiation detector according to claim 1, wherein the radiation detecting element includes single crystal GaAs.

6. A radiation detector according to claim 1, wherein if the specification value of the dark current density is $4 \times 10^{-9}$ A/cm$^2$ or smaller and the specification value of the carrier capturing efficiency is 50% or higher, an electric field having an intensity of 0.7 kV/cm or higher is applied to the charge emitting layer.

7. A radiation detector according to claim 1, further comprising:

a plurality of input pixels each including charge accumulating means for accumulating the charges converted from the incident radioactive ray, control means for controlling the electric field to be applied to the radiation detecting element and read means for reading a signal corresponding to the charges accumulated in said charge accumulating means;

output lines connected to said input pixels for outputting a signal corresponding to the charges read by said read means; and switch means for resetting the charges accumulated in said charge accumulating means.

8. A radiation detector according to claim 7, wherein at least said control means, said charge accumulating means and said read means are formed on a same insulating substrate.

9. A radiation detecting method, wherein when a radioactive ray is to be detected by applying an electric field to a charge emitting layer sandwiched between two semiconductor layers of different conductivity types for converting an externally incident radioactive ray into a charge and emitting the charge to an external, an electric field having an intensity satisfying a lower limit of a specification value of a carrier capturing efficiency and an upper limit of a specification value of a dark current density is applied to the charge emitting layer.

10. A radiation detecting method according to claim 9, wherein the electric field E to be applied to the charge emitting layer satisfies a following simultaneous inequalities (1) and (2):

$$E \leq \frac{J_0}{e}\left[\mu_e\left(C_e p_T + \frac{1}{\tau_{ec}}\right)^{-1}\left(e_e n_T + \frac{n_{p0}}{\tau_{ec}}\right) + \mu_h\left(C_h n_T + \frac{1}{\tau_{hc}}\right)^{-1}\left(e_h p_T + \frac{p_{n0}}{\tau_{hc}}\right)\right]^{-1} \quad (1)$$

$$\frac{\alpha_s \exp(-\alpha_T W)}{\alpha_s - \alpha_T W} \cdot \frac{1 - \exp[-(\alpha_s - \alpha_T)W]}{1 - \exp(-\alpha_s W)} \geq \eta_0 \quad (2)$$

where $J_0$ is a specification value of a dark current density, e is an elementary electric charge, $\mu_e$ is a mobility of an electron emitted at a trap level of the charge emitting layer, $C_e$ is a trap coefficient of an electron at the trap level of the charge emitting layer, $e_e$ is an emission coefficient of an electron at a trap level of the charge emitting layer, $\mu_h$ is a mobility of a hole emitted at a trap level of the charge emitting layer, $C_h$ is a trap coefficient of a hole at the trap level of the charge emitting layer, $e_h$ is an emission coefficient of a hole at the trap level of the charge emitting layer, $\tau_{ec}$ is an average collision time of an electron emitted at the trap level of the charge emitting layer, $\tau_{hc}$ is an average collision time of a hole emitted at the trap level of the charge emitting layer, $n_T$ and $p_T$ are concentrations of electrons and holes occupying trap levels of the charge emitting layer, $n_{p0}$ and $p_{n0}$ are concentrations of electrons in an equilibrium state in a p-type semiconductor layer and a concentration of holes in an equilibrium state in an n-type semiconductor layer, $\alpha_s$ is an attenuation coefficient indicating a distribution of concentrations of generated carriers, $\alpha_T$ ($=C_{epT}/\mu_e E$ or $C_{hnT}/\mu_h E$) is an attenuation coefficient of carriers at the trap level, W is a width of a depletion layer formed in the charge emitting layer, and $\eta_0$ is a specification value of a carrier capturing efficiency.

11. A radiation detecting method according to claim 10, wherein if the specification value of the dark current density is $4\times10^{-9}$ A/cm$^2$ or smaller and the specification value of the carrier capturing efficiency is 50% or higher, an electric field having an intensity of 0.7 kV/cm or higher is applied to the charge emitting layer.

12. A radiation detecting method according to claim 10, further comprising:

a radiation detecting step of detecting a radioactive ray;

a charge accumulating step of accumulating the charges detected by said radiation detecting step in charge accumulating means;

a control step of controlling an electric field to be applied to the radiation detecting element;

a read step of reading a signal corresponding to the charges accumulated by said charge accumulating step when an electric field controlled by said control step is applied to the radiation detecting means;

an output step of outputting a signal corresponding to the charges read by said read step to an output line; and a switch step of resetting the charges accumulated by said charge accumulating step.

13. A radiation detector according to claim 2, wherein if the specification value of the dark current density is $4\times10^{-9}$ A/cm$^2$ or smaller and the specification value of the carrier capturing efficiency is 50% or higher, an electric field E is applied to the charge emitting layer, the electric field E having an intensity satisfying $18.2857+0.87W+0.000321429W^2$ kV/cm$\leq$E$\leq$2.45 kV/cm where W is a width of a depletion layer formed in the charge emitting layer in the unit of $\mu$m.

* * * * *

UNITED STATES PATENT AND TRADEMARK OFFICE
CERTIFICATE OF CORRECTION

PATENT NO. : 6,833,549 B2
DATED : December 21, 2004
INVENTOR(S) : Takahiro Numai et al.

It is certified that error appears in the above-identified patent and that said Letters Patent is hereby corrected as shown below:

Drawings,
Sheet 23, FIG. 29, "CAPASITIVE" should read -- CAPACITIVE --.

Column 4,
Line 31, "n-type." should read -- $\pi$-type. --.

Column 7,
Line 9, "$\alpha_e$," should read -- $\alpha_{eT}$, --.

Column 8,
Line 11, "is" should read -- are --; and
Line 41, "preferable-because" should read -- preferable because --.

Column 14,
Line 25, "substraction" should read -- subtraction --.

Column 15,
Line 52, "resisters" should read -- registers --.

Column 19,
Line 22, "a" should read -- the --.

Column 20,
Line 33, "a" should read -- the --.

Signed and Sealed this

Twenty-fourth Day of May, 2005

JON W. DUDAS
*Director of the United States Patent and Trademark Office*